United States Patent
Chatterjee et al.

(10) Patent No.: US 10,957,002 B2
(45) Date of Patent: *Mar. 23, 2021

(54) SEQUENCE DEPENDENT OR LOCATION BASED OPERATION PROCESSING OF PROTOCOL BASED DATA MESSAGE TRANSMISSIONS

(71) Applicant: GOOGLE LLC, Mountain View, CA (US)

(72) Inventors: Surojit Chatterjee, Fremont, CA (US); Terry Van Belle, Santa Clara, CA (US); Anshul Kothari, Sunnyvale, CA (US); Jian Zhou, Milpitas, CA (US); Paul Feng, Palo Alto, CA (US); Ravi Jain, Palo Alto, CA (US); Nandita Narasimha Prabhu, Mountain View, CA (US); Yun Huang, Mountain View, CA (US); Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,943

(22) Filed: May 16, 2017

(65) Prior Publication Data

US 2018/0240211 A1    Aug. 23, 2018

Related U.S. Application Data

(63) Continuation-in-part of application No. 15/395,682, filed on Dec. 30, 2016, now Pat. No. 10,013,978, and
(Continued)

(51) Int. Cl.
*G06Q 30/02* (2012.01)
*G06Q 90/00* (2006.01)

(52) U.S. Cl.
CPC ......... *G06Q 90/00* (2013.01); *G06Q 30/0261* (2013.01)

(58) Field of Classification Search
None
See application file for complete search history.

(56) References Cited

U.S. PATENT DOCUMENTS 6,044,347 A    3/2000 Abella et al.
6,275,806 B1   8/2001 Pertrushin
(Continued)

FOREIGN PATENT DOCUMENTS

JP    2011-210238    10/2011
KR    10-0481141 B1    3/2005
(Continued)

OTHER PUBLICATIONS

"Location-based advertising—The Key to Unlocking the Most Value in the Mobile Advertising and Location-Based Services Markets" (published on Dec. 2009, written by Lisa Peterson and Rob Groot, available at https://www.mmaglobal.com/files/PetersonMobility_20100217144146.pdf) (Year: 2009).*

(Continued)

*Primary Examiner* — James M Detweiler
(74) *Attorney, Agent, or Firm* — Foley & Lardner LLP

(57) ABSTRACT

Various methods, systems, and computer program products are disclosed for communicating location-based digital components to a mobile and other devices. A natural language processor component can parse an input audio signal to identify a request and a keyword. A content selector can select digital components based on keyword and request. An audio signal generator component can generate an output signal that includes a selected digital components. An interface can transmit the output signal to cause a client computing device to drive a speaker to generate an acoustic wave
(Continued)

corresponding to the output signal prior to occurrence of at least one of the first action and the second action.

16 Claims, 13 Drawing Sheets

Related U.S. Application Data a continuation-in-part of application No. 13/790,087, filed on Mar. 8, 2013, now abandoned, which is a continuation of application No. 12/851,833, filed on Aug. 6, 2010, now Pat. No. 8,849,694.

(56) References Cited

U.S. PATENT DOCUMENTS

| | | | |
|---|---|---|---|
| 6,684,249 B1 | 1/2004 | Frerichs et al. | |
| 6,732,080 B1 | 5/2004 | Blants | |
| 6,857,007 B1 | 2/2005 | Bloomfield | |
| 6,907,566 B1 | 6/2005 | McElfresh et al. | |
| 7,668,754 B1 | 2/2010 | Bridgelall | |
| 7,853,255 B2 | 12/2010 | Karaoguz et al. | |
| 7,979,877 B2 | 7/2011 | Huber et al. | |
| 8,165,886 B1 | 4/2012 | Gagnon et al. | |
| 8,195,133 B2 | 6/2012 | Ramer et al. | |
| 8,249,925 B2 | 8/2012 | Broms et al. | |
| 8,370,197 B2 | 2/2013 | Axe et al. | |
| 8,386,386 B1 | 2/2013 | Zhu | |
| 8,666,807 B1 | 3/2014 | Murray et al. | |
| 8,849,694 B1* | 9/2014 | Chatterjee | G06Q 30/0261 705/14.1 |
| 8,903,716 B2 | 12/2014 | Chen et al. | |
| 9,424,840 B1 | 8/2016 | Hart et al. | |
| 9,767,479 B2 | 9/2017 | Filev et al. | |
| 10,013,978 B1 | 7/2018 | Bhaya et al. | |
| 10,089,647 B2 | 10/2018 | Juhasz | |
| 2002/0102988 A1 | 8/2002 | Myllymaki | |
| 2002/0116287 A1 | 8/2002 | Schubert et al. | |
| 2002/0116313 A1 | 8/2002 | Detering | |
| 2004/0044516 A1 | 3/2004 | Kennewick et al. | |
| 2004/0193488 A1 | 9/2004 | Khoo et al. | |
| 2004/0203860 A1* | 10/2004 | Fellenstein | H04M 3/493 455/456.1 |
| 2005/0267798 A1 | 12/2005 | Panara | |
| 2006/0224445 A1 | 10/2006 | Axe et al. | |
| 2007/0073723 A1 | 3/2007 | Ramer et al. | |
| 2007/0097975 A1 | 5/2007 | Rakers et al. | |
| 2007/0127688 A1 | 6/2007 | Doulton | |
| 2007/0197239 A1 | 8/2007 | Sane | |
| 2007/0281716 A1 | 12/2007 | Altman et al. | |
| 2008/0015863 A1 | 1/2008 | Ciprian et al. | |
| 2008/0248815 A1 | 10/2008 | Busch | |
| 2008/0250453 A1 | 10/2008 | Smith et al. | |
| 2009/0030800 A1 | 1/2009 | Grois | |
| 2009/0070211 A1 | 3/2009 | Gonen | |
| 2009/0192929 A1 | 7/2009 | Hoeflinger et al. | |
| 2009/0204410 A1 | 8/2009 | Mozer et al. | |
| 2009/0228270 A1 | 9/2009 | Odell et al. | |
| 2009/0292587 A1 | 11/2009 | Fitzgerald | |
| 2009/0326966 A1 | 12/2009 | Callaghan et al. | |
| 2010/0010890 A1 | 1/2010 | Ditkovski et al. | |
| 2010/0023396 A1 | 1/2010 | Subramanian et al. | |
| 2010/0050098 A1 | 2/2010 | Turner | |
| 2010/0057639 A1 | 3/2010 | Schwarz et al. | |
| 2010/0088719 A1 | 4/2010 | Hawkins et al. | |
| 2010/0176985 A1* | 7/2010 | Sharma | G01S 5/14 342/386 |
| 2010/0211439 A1 | 8/2010 | Marci et al. | |
| 2010/0292991 A1 | 11/2010 | Lv | |
| 2011/0035379 A1 | 2/2011 | Chen et al. | |
| 2011/0067099 A1 | 3/2011 | Barton et al. | |
| 2011/0078014 A1 | 3/2011 | Feldman et al. | |
| 2011/0208596 A1 | 8/2011 | Kwon et al. | |
| 2011/0246286 A1 | 10/2011 | Cetin et al. | |
| 2012/0030034 A1 | 2/2012 | Knapp et al. | |
| 2012/0041766 A1 | 2/2012 | Gong et al. | |
| 2012/0123856 A1 | 5/2012 | Paunikar et al. | |
| 2012/0130798 A1 | 5/2012 | Cooley et al. | |
| 2012/0180083 A1 | 7/2012 | Marcus | |
| 2012/0203627 A1 | 8/2012 | Balseiro et al. | |
| 2012/0265528 A1 | 10/2012 | Gruber et al. | |
| 2013/0036202 A1 | 2/2013 | Lahav | |
| 2013/0063550 A1* | 3/2013 | Ritchey | G16H 40/63 348/36 |
| 2013/0066725 A1 | 3/2013 | Umeda | |
| 2013/0111487 A1 | 5/2013 | Cheyer et al. | |
| 2013/0117022 A1 | 5/2013 | Chen et al. | |
| 2013/0151332 A1 | 6/2013 | Yan et al. | |
| 2013/0275164 A1 | 10/2013 | Gruber et al. | |
| 2013/0304758 A1 | 11/2013 | Gruber et al. | |
| 2013/0317823 A1 | 11/2013 | Mengibar | |
| 2014/0067455 A1* | 3/2014 | Zhang | G06O 10/109 705/7.24 |
| 2014/0278981 A1 | 9/2014 | Mersov et al. | |
| 2015/0194167 A1 | 7/2015 | Jeong | |
| 2015/0302458 A1 | 10/2015 | Dides et al. | |
| 2015/0363748 A1* | 12/2015 | Beaurepaire | G06Q 10/1095 705/7.19 |
| 2016/0042736 A1* | 2/2016 | Lee | G06F 17/279 704/275 |
| 2016/0104200 A1* | 4/2016 | Osotio | G06Q 30/0267 705/14.64 |
| 2016/0357519 A1 | 12/2016 | Vargas | |
| 2017/0034592 A1 | 2/2017 | Ray et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1* | 5/2017 | Karashchuk | H04W 4/12 |
| 2017/0358301 A1 | 12/2017 | Raitio et al. | |
| 2018/0052573 A1 | 2/2018 | Comertoglu et al. | |
| 2018/0190276 A1 | 7/2018 | Bhaya et al. | |
| 2018/0308484 A1 | 10/2018 | Bhaya et al. | |

FOREIGN PATENT DOCUMENTS

| | | |
|---|---|---|
| KR | 10-2008-0072673 A | 8/2008 |
| KR | 10-2012-0110751 A | 10/2012 |
| KR | 10-2012-0137425 | 12/2012 |

OTHER PUBLICATIONS

U.S. Appl. No. 13/532,209, filed Jun. 25, 2012.
"Going with CPT (cost per time) over CPM for Ads", Startup Nation Business Forum, http://www.startupnation.com/Going-with-CPT-cost-per-time-over-CPM-for-ads/topic/S, Dec. 4, 2010, 3 pgs. [Retrieved from website Jun. 11, 2013].
"Going with CPT (cost per time) over CPM for Ads", Startup Nation Business Forum, 3 pages.
"Walmart and Google to offer voice-enabled shopping", BBC News, Aug. 23, 2017.
Ad Traders, "Attention Economics Pricing in Advertising: Cost Per Second" Ad Exchanger, 5 pages.
Ad Traders, "Attention Economics Pricing in Advertising: Cost Per Second", Ad Exchanger, http://www.adexchanger.com/data-driven-thinking/attention-economics/, Oct. 19, 2010, [Retrieved from website Jun. 22, 2015].
Amazon, "Echo Look | Hands-Free Camera and Style Assistant" reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Anita Wilhelm, Yuri Takhteyev, Risto Sarvas, Nancy Van House, and Marc Davis. 2004. Photo annotation on a camera phone. In CHI '04 Extended Abstracts on Human Factors in Computing Systems (CHI EA '04). ACM, New York, NY, USA, 1403-1406. DOI=http://dx.doi.org/10.1145/985921.986075.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.

(56) References Cited

OTHER PUBLICATIONS

Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Donald J. Patterson, Xianghua Ding, Nicholas Noack. 2006. Nomatic: Location by, for, and of crowds. Proceedings of International Workshop on Location- and Context-Awareness LoCA 2006. 186-203. DOI=10.1007/11752967_13.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Giovanni Iachello, Ian Smith, Sunny Consolvo, Gregory D. Abowd, Jeff Hughes, James Howard, Fred Potter, James Scott, Timothy Sohn, Jeffrey Hightower, Anthony LaMarca. 2005. Control, Deception, and Communication: Evaluating the Deployment of a Location-Enhanced Messaging Service. In 7th International Conference, UbiComp 2005, Tokyo, Japan, Sep. 11-14, 2005. Proceedings, 213-231. DOI=10.1007/11551201_13.
Giovanni Iachello, Ian Smith, Sunny Consolvo, Mike Chen, and Gregory D. Abowd. 2005. Developing privacy guidelines for social location disclosure applications and services. In Proceedings of the 2005 symposium on Usable privacy and security (SOUPS '05). ACM, New York, NY, USA, 65-76. DOI=http://dx.doi.org/10.1145/1073001.1073008.
Golgowski, Nina, "This Burger King Ad Is Trying to Control Your Google Home Device", Huffpost, Apr. 12, 2017 (7 pages).
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Ian Smith, Sunny Consolvo, Anthony Lamarca, Jeffrey Hightower, James Scott, Timothy Sohn, Jeff Hughes, Giovanni Iachello, Gregory D. Abowd. 2005. Social Disclosure of Place: From Location Technology to Communication Practices. Third International Conference, PERVASIVE 2005. 134-151. DOI=10.1007/11428572_9.
Ian Smith. 2005. Social-Mobile Applications. Computer 38, 4 (Apr. 2005), 84-85. DOI=http://dx.doi.org/10.1109/MC.2005.140.
International Preliminary Report on Patentability for PCT/US2013/047593 dated Jan. 8, 2015.
International Preliminary Report on Patentability on PCT/US2014/036341 dated Dec. 15, 2015, 6 pgs.
International Search Report and Written Opinion in PCT Application No. PCT/US2014/036341 dated Sep. 2, 2014.
International Search Report and Written Opinion on PCT/US2013/047593 dated Nov. 4, 2013.
Juhong Liu, O. Wolfson and Huabei Yin. 2006. Extracting Semantic Location from Outdoor Positioning Systems. 7th International Conference on Mobile Data Management. doi: 10.1109/MDM.2006.87.

Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Larson, Selena, "Google Home now recognizes your individual voice", CNN Money, San Francisco, California, Apr. 20, 2017 (3 pages).
Lee, Dave, "The five big announcements from Google I/O", BBC, May 18, 2017, 11 pages.
Marc Davis, Michael Smith, Fred Stentiford, Adetokunbo, John Canny, Nathan Good, Simon King, Rajkumar Janakiraman. 2006. Using context and similarity for face and location identification. In Proceedings of the IS&T/SPIE 18th Annual Symposium on Electronic Imaging Science and Technology.
Marc Davis, Nancy Van House, Jeffrey Towle, Simon King, Shane Ahern, Carrie Burgener, Megan Finn, Vijay Viswanathan, Matthew Rothenberg. 2005. MMM2: Mobile Media Metadata for Media Sharing. In Extended Abstracts of the Conference on Human Factors in Computing Systems. ACM, New York, NY, USA, 1335-1338.
Marc Davis, Simon King, Nathan Good, and Risto Sarvas. 2004. From context to content: leveraging context to infer media metadata. In Proceedings of the 12th annual ACM international conference on Multimedia (Multimedia '04). ACM, New York, NY, USA, 188-195. DOI=http://dx.doi.org/10.1145/1027527.1027572.
Nieva, Richard, "Google Home and eBay can tell you how much that's worth", cnet, Mar. 8, 2017 (3 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Risto Sarvas, Erick Herrarte, Anita Wilhelm, and Marc Davis. 2004. Metadata creation system for mobile images. In Proceedings of the 2nd international conference on Mobile systems, applications, and services (MobiSys '04). ACM, New York, NY, USA, 36-48. DOI= http://dx.doi.org/10.1145/990064.990072.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps Legal Challenges At 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Spalding, Steve, "How to Cost User Engagement", How to Spilt an Atom—Ideas Reborn, 4 pages.
Spalding, Steve, "How to Cost User Engagement", How to Split an Atom—Ideas Reborn, http://howtosplitanatom.com/how-to-read-shorts/how-to-cost-user-engagement/, Sep. 20, 2007, [Retrieved from website Jun. 22, 2015].

(56) References Cited

OTHER PUBLICATIONS

Takashi Yoshino, Tomohiro Muta and Jun Munemori. 2002. NAMBA: location-aware collaboration system for shopping and meeting. IEEE Transactions on Consumer Electronics, vol. 48, No. 3. 470-477. doi: 10.1109/TCE.2002.1037030.
U.S. Notice of Allowance on U.S. Appl. No. 13/532,209 dated Jul. 10, 2017.
U.S. Notice of Allowance on U.S. Appl. No. 13/532,209 dated Mar. 31, 2017.
U.S. Notice of Allowance on U.S. Appl. No. 13/790,087 dated Jan. 6, 2016.
U.S. Office Action on U.S. Appl. No. 12/851,833 dated Aug. 8, 2012.
U.S. Office Action on U.S. Appl. No. 13/532,209 dated Nov. 4, 2013.
U.S. Office Action on U.S. Appl. No. 13/532,209 dated Jul. 3, 2013.
U.S. Office Action on U.S. Appl. No. 13/532,209 dated Mar. 4, 2014.
U.S. Office Action on U.S. Appl. No. 13/532,209 dated Oct. 28, 2016.
U.S. Office Action on U.S. Appl. No. 13/790,087 dated Jan. 26, 2017.
U.S. Office Action on U.S. Appl. No. 13/790,087 dated Jun. 9, 2016.
U.S. Office Action on U.S. Appl. No. 13/916,407 dated Jun. 19, 2015.
U.S. Office Action on U.S. Appl. No. 13/916,407 dated Nov. 17, 2015.
U.S. Office Action on U.S. Appl. No. 13/972,379 dated Jun. 24, 2015.
Willens, Max, "For publishers, Amazon Alexa holds promise but not much money (yet)", Digiday, Jul. 6, 2017, 5 pages.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/049709 dated Dec. 5, 2017, 12 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, "Take Two for Samsung's troubled Bixby assistant", BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
Buckland et al., "Amazon's Alexa Takes Open-Source Route to Beat Google Into Cars", Bloomberg, Feb. 27, 2018, 6 pages.
Non-Final Office Action on U.S. Appl. No. 15/091,323 dated Feb. 25, 2019.
Non-Final Office Action on U.S. Appl. No. 15/498,237 dated Feb. 8, 2019.
Non-Final Office Action on U.S. Appl. No. 15/584,839 dated Feb. 25, 2019.
Notice of Reasons for Rejection for JP Application No. 2017-556903 dated Feb. 25, 2019.
Office Action for Korean Patent Application No. 10-2017-7031607 dated Jan. 24, 2019.
U.S. Notice of Allowance for U.S. Appl. No. 15/395,682 dated Feb. 26, 2018. 9 pages.
U.S. Notice of Allowance for U.S. Appl. No. 15/395,682 dated Feb. 26, 2016.
Decision to Grant a Patent for JP 2017-556903 dated Oct. 7, 2019 (5 pages).
Final Office Action for U.S. Appl. No. 13/790,121 dated Dec. 17, 2014 (5 pages).
Non-Final Office Action for U.S. Appl. No. 13/790,121 dated Aug. 13, 2014 (6 pages).
Non-Final Office Action for U.S. Appl. No. 15/632,924 dated Oct. 9, 2019 (17 pages).
Non-Final Office Action for U.S. Appl. No. 16/018,854 dated Oct. 4, 2019 (23 pages).
Notice of Allowance for U.S. Appl. No. 13/790,121 dated Aug. 27, 2015 (8 pages).
Notice of Allowance for U.S. Appl. No. 13/790,121 dated Jun. 9, 2014 (8 pages).
Reason for Refusal for KR 10-2017-7031607 dated Sep. 16, 2019 (7 pages).
Communication pursuant to Article 94(3) EPC for Appl. Ser. No. EP 17772516.5 dated Mar. 27, 2019 (5 pages).
Foreign Action other than Search Report on KR 10-2017-7031607, dated Jul. 26, 2019, 7 pages.
Non-Final Office Action on U.S. Appl. No. 15/584,839 dated Sep. 6, 2019.
Notice of Allowance on U.S. Appl. No. 15/498,237, dated Aug. 12, 2019, 8 pages.
U.S. Office Action for U.S. Appl. No. 15/632,924 dated May 1, 2019 (57 pages).
Examination Report for IN Appln. Ser. No. 201747039586 dated Jan. 24, 2020 (6 pages).
Final Office Action for U.S. Appl. No. 16/018,854 dated Mar. 9, 2020 (27 pages).
Examination Report for AU Appl. Ser. No. 2017386093 dated Nov. 29, 2019 (2 pages).
Notice of Allowance for U.S. Appl. No. 15/498,237 dated Nov. 29, 2019 (6 pages).
Examination Report for AU Ser. Appln. No. 2020201889 dated Sep. 4, 2020 (4 pages).
Office Action for KR Appln. Ser. No. 10-2020-7014345 dated Sep. 17, 2020 (15 pages).
Finch, Dezon K., "TagLine: Information Extraction for Semi-Structured Text Elements in Medical Progress Notes", Scholar Commons, Graduate Theses and Dissertations, University of South

(56) References Cited

OTHER PUBLICATIONS

Florida, Jan. 2012, retrieved Mar. 25, 2020 from URL: http://scholarcommons.usf.edu/etd/4321 (251 pages).
Nahm, Un Yong, "Text Mining with Information Extraction", May 30, 2010, retrieved Mar. 25, 2010 from URL: http://neuro.bstu.by/ai/Data-mining/ut-ai-tr04-311.pdf (132 pages).
Non-Final Office Action for U.S. Appl. No. 15/584,839 dated May 1, 2020 (17 pages).
Notice of Allowance for U.S. Appl. No. 15/632,924 dated Mar. 31, 2020 (13 pages).
Notice of Allowance for U.S. Appl. No. 16/018,854 dated Jul. 30, 2020 (8 pages).
Final Office Action for U.S. Appl. No. 15/584,839 dated Dec. 16, 2020 (19 pages).
Reasons for Rejection for JP Appln. Ser. No. 2019-200982 dated Nov. 16, 2020 (9 pages).

\* cited by examiner

SEQUENCE DEPENDENT OR LOCATION BASED OPERATION PROCESSING OF PROTOCOL BASED DATA MESSAGE TRANSMISSIONS

CROSS-REFERENCE TO RELATED PATENT APPLICATIONS

This application is a continuation-in-part of and claims priority under 35 U.S.C. § 120 to U.S. application Ser. No. 13/790,087, filed Mar. 8, 2013, which claims the benefit of priority under 35 U.S.C. § 120 to U.S. application Ser. No. 12/851,833, now U.S. Pat. No. 8,849,694, filed Aug. 6, 2010. This application is also a continuation-in-part of and claims priority under 35 U.S.C. § 120 to U.S. application Ser. No. 15/395,682, filed Dec. 30, 2016. Each of the foregoing applications are hereby incorporated herein by reference in their entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices. The transmission can be further complicated by the introduction of mobile computing. The location and movement of the mobile computing device can cause the selection of improper content items, the transmission of which can unnecessarily use bandwidth.

SUMMARY

According to one aspect of the disclosure, a system to select digital components includes a data processing system that can have one or more processors. The data processing system can receive a request that can include one or more keywords. The data processing system can determine a present location that is associated with the client device. The data processing system can identify a prior request that was received by the data processing system and associated with the client device. The data processing system can select a plurality of candidate digital components. Each of the plurality of candidate digital components can be associated with a geographical location. The data processing system can calculate or otherwise determine a distance between the present location associated with the client device and the geographical location of each of the plurality of candidate digital components. The data processing system can determine a prediction value for each of the plurality of candidate digital components. Each of the prediction values can be based on the distance between the present location associated with the client device and the respective geographical location of each of the plurality of candidate digital components. Each of the prediction values can also be based on the prior request. The data processing system can select a digital component from the plurality of candidate digital components based on the prediction value of each of the plurality of candidate digital components. The data processing system can transmit the digital component to the client device.

According to another aspect of the disclosure, a method can include receiving, by a data processing system from a client device, a request comprising one or more keywords. The method can include determining, by the data processing system, a present location associated with the client device. The method can include identifying a prior request received by the data processing system. The prior request can be associated with the client device. The method can include selecting, by the data processing system, a plurality of candidate digital components. Each of the plurality of candidate digital components can be associated with a geographical location. The method can include calculating, by the data processing system, a distance between the present location associated with the client device and the geographical location of each of the plurality of candidate digital components. The method can include determining, by the data processing system, a prediction value for each of the plurality of candidate digital components. Each of the prediction values can be based on the distance between the present location associated with the client device and the respective geographical location of each of the plurality of candidate digital components. The prediction value can also be based on the prior request. The method can include selecting, by the data processing system, a digital component from the plurality of candidate digital components. The digital component can be selected based on the prediction value of each of the plurality of candidate digital components. The method can include transmitting the digital component to the client device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Figure 1A:
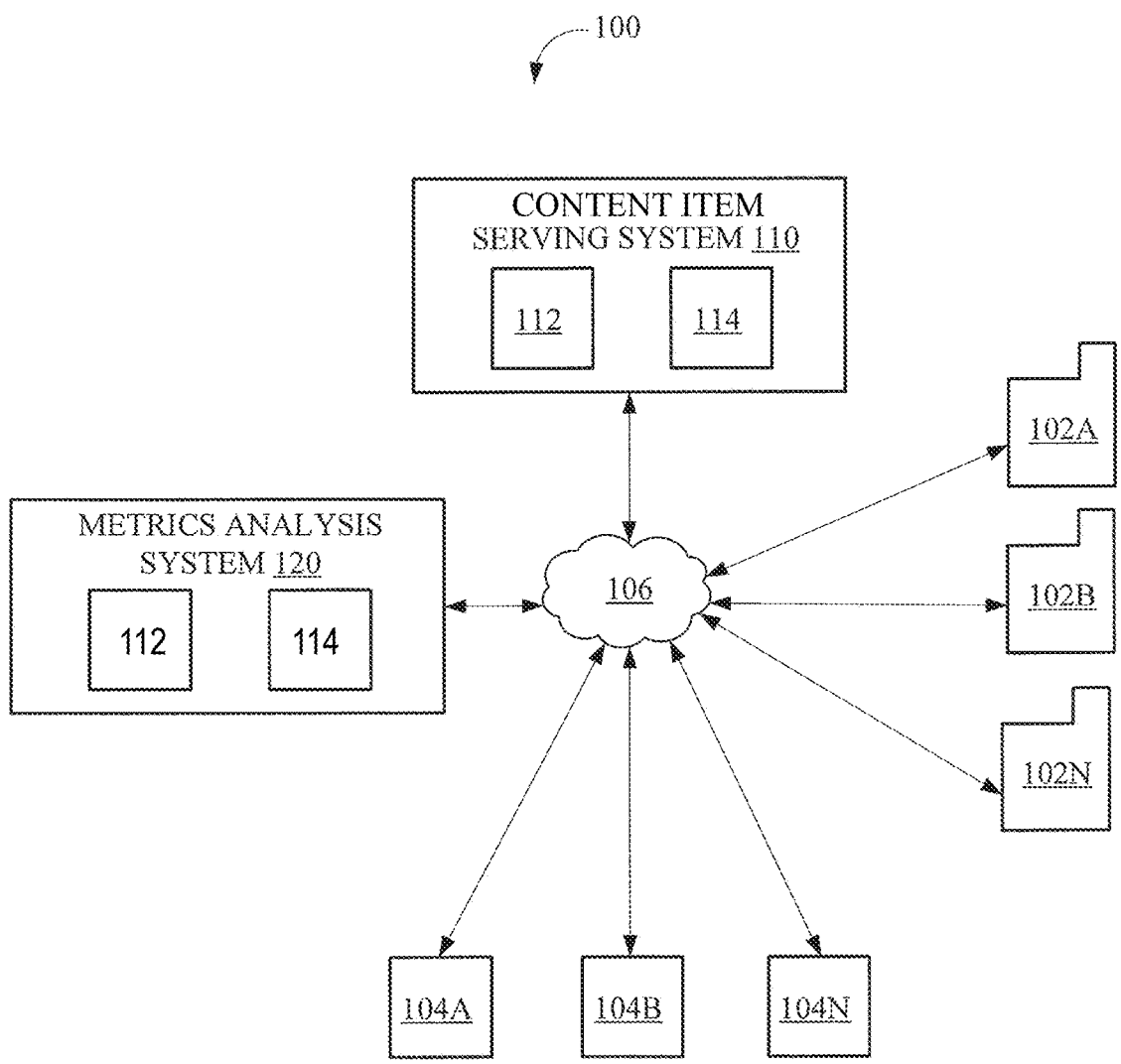
FIG. 1A is a block diagram illustrating a system of communicating location-based content items to mobile communication devices, according to various implementations of the disclosure.

Following below are more detailed descriptions of various concepts related to, and implementations of, methods, apparatuses, and systems to optimize processing of sequence dependent operations in a voice activated computer network environment. The various concepts introduced above and discussed in greater detail below may be implemented in any of numerous ways.

Systems and methods of the present disclosure relate generally to a data processing system that optimizes or dynamically adjusts an order of processing sequence dependent operations via data packet based transmissions in a voice activated computer network environment. The data processing system can improve the efficiency and effectiveness of data packet transmission over one or more computer networks by, for example, asynchronously, out-of-sequence, or dynamically selecting operations from a plurality of sequence dependent operations. Data packets or other protocol based signals corresponding to the selected operations can be routed through a computer network between multiple computing devices. The data processing system can temporarily or permanently skip initial operations of a set of sequence dependent operations and can instead proceed to an operation that corresponds to a later-in-time or final operation. By bypassing packet or other protocol based data transmissions that correspond to an early operation of a plurality of sequence dependent operations, and instead proceeding directly to packet based data transmissions for later stage operations in a sequence of operations the data processing system can reduce, delay, or eliminate data processing associated with the early stage operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query. From the input audio query the data processing system can identify a request and a trigger keyword corresponding to the request. Based on the trigger keyword or the request, the data processing system can determine a thread that indicates a plurality of sequence dependent operations. For example, the thread can indicate a first action, a second action that is subsequent to the first action, and a third action that is subsequent to the second action. The third action, which in this example is the last action in a thread of sequence dependent operations, can be used by the data processing system to select a content item prior to occurrence of the first action and prior to occurrence of the second action. This can be done before or without performing at least some of the data processing operations based on the first action or the second action. Bypassing these processing operations causes the content item for the third action to be selected with less data processing and less electrical power usage than would be the case without the bypass.

The content item can include an output signal. The data processing system can provide the content item including the output signal by packet or other protocol based data message transmission via a computer network to a client computing device. The output signal can cause an audio driver component of the client computing device to generate an acoustic wave, e.g., an audio output, which can be output from the client computing device. The audio output corresponds to the third (e.g., last or latest in time) action and can by output from the client computing device prior to occurrence of the first action or prior to occurrence of the second action. The bypassing of the first and second actions (or the bypassing of selecting and providing content items corresponding to these actions) to first select and send the content item corresponding to the third action prior to occurrence of the first and second sequence dependent actions results in fewer data processing operations, less memory usage, and less network bandwidth utilization than would be the case without the bypass.

FIG. 1A is a block diagram illustrating a system 100 of communicating location-based content items to mobile communication devices, according to various implementations of the disclosure. Digital components can be referred to as content items or messages. A content item is a component of a digital component. A digital component is a component of a content item. Content items may include, but is not limited to, ads, coupons, restaurant menus, directions, and/or other content. According to various implementations of the disclosure, system 100 may include, but is not limited to, a content item serving system 110 (also referred to as a data processing system), a metrics analysis system 120, a mobile communication device 102 (illustrated in FIG. 1A as a plurality of mobile devices 102A, 102B, 102N), and a client device 104 (illustrated in FIG. 1A as client devices 104A, 104B, 104N). The client device 104 can be a mobile communication device 102.

In some implementations of the disclosure, content item serving system 110, metrics analysis system 120, mobile communication device 102, and client device 104 may be coupled to one another via a network 106. Network 106 may include a Local Area Network, a Wide Area Network, a cellular communications network, a Public Switched Telephone Network, and/or other network or combination of networks.

In some implementations of the disclosure, content item serving system 110 may receive a request associated with mobile communication device 102. In some implementations of the disclosure the request includes a request for a content item to be delivered to mobile communication device 102. In some implementations of the disclosure, the request is associated with a "pull" request where mobile communication device 102 requests information. In other words, the request may include or otherwise originate from the pull request such that results from the pull request can include the content. For example, the pull request may include, but is not limited to, keyword search terms for conducting an online search, a request for content items from an application executing on mobile communication device 102, and/or other request for information originating from mobile communication device 102. In a non-limiting example, a user of mobile communication device 102 may be near a shopping district and enter a keyword search term "jeans" in order to find retailers that sell jeans. In another example, the pull request may be associated with a location-based application executing on mobile communication device 102. The location-based application when executed by mobile communication device 102 may, for example, find nearby points of interest. The request may include or originate from the pull request (such as the search request or the location-based application request) to cause one or more content items to be displayed with the results of the pull request.

In some implementations of the disclosure, the request is associated with a "push" request where information is communicated to mobile communication device 102 based on predefined settings. In a non-limiting example, the push request may include a subscription to one or more content items of an entity such as a clothing retailer. The subscription may, for example, include pushing to mobile communication device 102 content items that: indicate sales events, include coupons, or otherwise conveys content items.

In some implementations of the disclosure, in response to the request, content item serving system 110 may determine a location of mobile communication device 102 and at least one potential interest of a user of mobile communication device 102. In some implementations of the disclosure, the location is determined based on location-based information. In some implementations of the disclosure, the at least one potential interest of the user is determined based on interest-based information.

In some implementations of the disclosure, the location may be directly determined based on the location-based information. For example, the location-based information may include, but is not limited to, latitude and longitude coordinates. In some implementations of the disclosure, the location may be determined based on an approximation based on the location-based information. For example, the location-based information may include, but is not limited to, an identifier that identifies a cellular tower in communication with mobile communication device 102. The range and/or location of the cellular tower may be known so that an approximate location of mobile communication device 102 may be determined.

In some implementations of the disclosure, the location-based information may include, but is not limited to, Global Positioning System (GPS) information, Wireless Local Area Network information such as WiFi information, cellular tower information, an Internet Protocol (IP) address, prior keyword search information (which may suggest a location), map application information (such as a geographic map or directions displayed at mobile communication device 102), and/or other information from which the location may be determined.

In some implementations of the disclosure, the location may be determined based on a hierarchical ranking of location-based information based on reliability, accuracy, precision, and/or other performance metric. For example, a first location-based information may be more reliable, accurate, precise, or otherwise more effective for determining the location than a second location-based information. When the first location-based information is not available, the second location-based information may be used. A third location-based information may be used when the second location-based information is not available, and so-on. In some implementations of the disclosure, when the user of mobile communication device 102 grants permission to communicate the location-based information, the granted location-based information may be hierarchically higher than (i.e., preferentially used over) other location-based information.

In some implementations of the disclosure, interest-based information may include actions or other behavior of the user of mobile communication device 102 that potentially indicates content that is interesting to the user. In other words, actions or behavior of the user may indicate interests of the user. In some implementations of the disclosure, interest-based information may include, but is not limited to, one or more keywords of a search, prior selections of content items (i.e., content items and/or types, such as coupons, etc., of content items that the user has previously selected), a history of web pages visited by the user, and/or other information that may indicate one or more interests of the user.

For instance, based on search terms that include planetary names or star names, content item serving system 110 may determine that the user is potentially interested in astronomy. Based on a history of user selections of content items that displays shoe specials, for example, content item serving system 110 may determine that the user is potentially interested in shoes (or more generally, that the user is interested in shopping). Based on a history of user web page visits to sports scores, for example, content item serving system 110 may determine that the user is potentially interested in sports. Thus, based on interest-based information, potential interests of the user may be determined.

As used herein, "selecting" or "selection of" content items includes, but is not limited to, clicking with a finger, a stylus, or other object; shaking or tapping mobile communication device 102; uttering a verbal command; and/or taking any other action in relation to mobile communication device 102 to indicate a selection of a content item.

In some implementations of the disclosure, the interest-based information may be stored at mobile communication device 102 (and subsequently communicated to content item serving system 110), at content item serving system 110, and/or other location accessible by content item serving system 110 to identify an appropriate content item. In some implementations of the disclosure, as would be appreciated, content item serving system 110 and/or mobile communication device 102 may store or otherwise have access to a user profile that identifies the user and includes the interest-based information of the user.

In some implementations of the disclosure, content item serving system 110 may identify, based on the location of mobile communication device 102 and the at least one potential interest of the user, a content item from among a plurality of content items. In some implementations of the disclosure, the plurality of content items is included within a queue of content items that are to be communicated via a content network. Because the content item is identified based on a combination of the location of the user (as determined from the location of mobile communication device 102) and a potential interest of the user, the identified content item may have a likelihood of being selected by the user that is greater than a content item identified based on only one of the location or the interest of the user.

In some implementations of the disclosure, a user may, for example, enter a search key word "shopping" using mobile communication device 102. Based on a determined location of mobile communication device 102 and a determined interest of the user (such as an interest in shoes), content item serving system 110 may identify a particular content item that indicates a special on shoes from a shoe store that is within close proximity to (i.e., a specified distance from) the user. In this manner, both the interest of the user and the location of the user is used to identify the particular content item. In contrast, conventional systems may communicate a content item for fishing gear merely because a fishing goods store is nearby even though the user has not indicated interest in such gear. In these conventional systems, the content item may have a feeling of "spam" to the user.

In some implementations of the disclosure, content item serving system 110 may communicate the content item to be displayed at mobile communication device 102. In some implementations of the disclosure, content item serving system 110 may communicate the identified content item to a third party that subsequently communicates the content item to mobile communication device 102. In some implementations of the disclosure, content item serving system 110 may communicate the identified content item to mobile communication device 102.

In some implementations of the disclosure, content item serving system 110 may generate, based on the location and the at least one potential interest, a plurality of predictions each corresponding to one of a plurality of content items. Each prediction may indicate a probability that a corresponding content item will be selected by a user of mobile communication device 102. Thus, in some implementations, the location of mobile device 102 and the interest of the user may affect the probability that a content item will be selected. For example, a first content item having a higher probability of being selected than a second content item may be identified to be delivered or communicated to mobile communication device 102 instead of the second content item. In these implementations, content item serving system 110 may identify a content item based on the predictions. In other words, content item serving system 110 may identify content items that are more likely to be selected by the user than other content items based on the location and user interests.

In some implementations of the disclosure, content item serving system 110 may determine, based on the location of mobile communication device 102, a distance between mobile communication device 102 and a physical location of an entity associated with the content item. In these implementations, a prediction corresponding to the content item may be based on the distance and the interests of the user. For example, at least some of the plurality of content items (such as the messages in the queue of content items) may be associated with or otherwise originate from an entity such as a retailer that operates a physical location such as a retail store. In some implementations of the disclosure, content item serving system 110 may determine a distance between mobile communication device 102 and the physical location of the entity. In these implementations, the probability that the user will select a particular content item may increase as the user gets closer to the physical location of the entity. As such, content item serving system 110 may use the distance between mobile communication device 102 and the physical location of the entity when determining the prediction corresponding to the content item from the entity.

For example, a first content item may be associated with or otherwise originate from a first entity having a physical location that has a first distance from the user (i.e., mobile communication device 102). A second content item may be associated with or otherwise originate from a second entity having a physical location that has a second distance from the user that is greater than the first distance. A third content item may be associated with or otherwise originate from a third entity such as an Internet-only retailer that has no physical locations. In the foregoing examples, assuming the content items are associated with the same level of interest from the consumer, content item serving system 110 may determine a higher probability of being selected by the user for the first content item than the second content item and a higher probability of being selected by the user for the second content item than the third content item. As would be appreciated, the prediction may be based on a balancing of distance/location and interest-based factors.

In some implementations of the disclosure, each of the plurality of content items may be associated with a bid. The bid may include a value or other indication that indicates a dollar or other currency amount that an originator, such as an content provider, of a content item is willing to pay to have the content item displayed in the content network to which content item serving system 110 has access. For example, content item serving system 110 may receive or otherwise obtain the bid. In these implementations, content item serving system 110 may determine an expected revenue return value based on the bid value and the prediction corresponding to the content item and may identify a content item based on the expected revenue return value. In other words, content item serving system 110 may identify content items in a manner that is expected to maximize fees from entities such as content providers that wish to promote their goods and/or services via content items.

In some implementations of the disclosure, the expected revenue return value is given by the equation:

$$E = p \times b \qquad (1)$$

In equation (1): E is the expected revenue return value (obtained by the product of p and b); p is the probability that the content item will be selected by the user; and b is the bid. Thus, in some implementations, the expected revenue return value may be based on a combination of the prediction/probability of being selected (which itself may be based on the location and the interest of the user) and the bid. In these implementations, the bid may be sufficiently high to overcome a prediction with a low probability and vice versa.

In some implementations of the disclosure, p is a function of various input predictive factors, x, as given by the equation:

$$p = f(x) \qquad (2)$$

In equation (2), x may include, for example, distance from physical location, interest-based information, historical performance of content items (such as whether a content item was selected by the user), and/or other predictive factors described below. Based on one or more of the predictive factors, a probability that a content item will be selected by the user may be generated.

In some implementations of the disclosure, the bid is changed as a function of the distance, d, as given by the equation:

$$b = g(d) \qquad (3)$$

In other words, content item serving system 110 may associate different bids of a content item for different distances. For example, an entity such as an content provider may be willing to pay more for a content item delivered to the user via mobile communication device 102 when the user is at a closer distance from a physical location than a farther distance. The entity may submit—and content item serving system 110 may receive—different bids for different distances.

In some implementations of the disclosure, content of the content item is changed as a function of the distance. In other words, content item serving system 110 may cause different content of the content item to be communicated to mobile communication device 102 based on the distance between mobile communication device 102 and a physical location of an entity associated with the content item. In this manner, an entity such as an content provider may choose to display different content based on different distances from a physical location of the entity. The content may include, but is not limited to, walking directions to the physical location, an input to make reservations, an input to search product availability, one or more images associated with the physical location, one or more promotional offers, a restaurant menu, a business update, a phone number call-to-action, an ad check-in, one or more upcoming events, and/or other content. For example, when mobile communication device 102 is at a first distance from the physical location, content item serving system 110 may cause coupons to be delivered to mobile communication device 102. When mobile communication device 102 is at a second distance closer than the first distance, content item serving system 110 may cause directions to be delivered to mobile communication device 102. As would be appreciated, different permutations of different content at different distances may be used. The different permutations may be specified by the entity and/or be determined by content item serving system 110.

In some implementations of the disclosure, the distance is associated with accuracy information that indicates an accuracy of the distance. In these implementations, the prediction corresponding to the content item may be based on the accuracy information. For example, content item serving system 110 may increase or decrease the probability that the user will be interested in a content item based on the accuracy of the location-based information used to determine the location of mobile communication device 102.

In some implementations of the disclosure, content item serving system 110 may determine a weight factor for at least one of the distance and the interest-based information. In these implementations, the plurality of predictions is based on the determined weight factor. The weight factor may increase or decrease a weight given to the distance and/or interest-based information when generating a prediction of the probability that a user will be interested in a content item. In some implementations of the disclosure, the weight factor is used to emphasize more important or otherwise more predictive factors. For example, the location of mobile communication device 102 may be more heavily weighted than a history of web page visits. In this non-limiting example, content item serving system 110 may generate a prediction that relies more on the location of mobile communication device 102 than the history of web page visits. In this manner, different (location and interest) variables may be weighted differently so that the corresponding effect of each variable on the overall predication may be controlled.

In some implementations of the disclosure, content item serving system 110 may receive an indication that the content item was selected at mobile communication device 102 and may generate a plurality of subsequent predictions based on the indication. In other words, one or more user actions associated with mobile communication device 102 may be collected for subsequent analysis and predictions. Thus, the predictions generated by content item serving system 110 may change over time based on interest-based information.

In some implementations of the disclosure, the predictions are based on logistic regression analysis. For example, a prediction that a particular content item will be selected by the user may be generated. The prediction may be based on a variety of predictive factors such as different types of user-based interest described herein, distance from physical locations, and/or other factors used to predict whether the particular content item will be selected. One or more predictive factors may be assessed according to a click-through rate or other indication that the user selected the particular content item.

In some implementations of the disclosure, future predictions generated by content item serving system 110 may be based on a weighting of the predictive factors relative to one another based on whether the particular content item was selected by the user. In this manner, more important predictive factors (i.e., better predictors) may be weighed more heavily than less important predictive factors. Thus, more important predictive factors may affect the prediction outcome to a greater degree than less important predictive factors. For example, if smaller distances between a user (measured via mobile communication device 102) and a physical location is correlated with higher click-through rates than larger distances, then distance information may be weighted accordingly so that it is a relatively important predictive factor. If a history of prior content item selections by the user is a weak predictor of future selections by the user, then the history of the particular user may be assigned a lower weight. By fine-tuning the weights of these and other predictive factors, predictions that adapt to observed behavior may be achieved.

In some implementations of the disclosure, weighting of the predictive factors may be fine-tuned in this manner until an acceptable level of accuracy (such as a particular click-through rate) is achieved or otherwise until fine-tuning is no longer necessary. In some implementations, the predictive factors may be fine-tuned indefinitely as data becomes available.

According to various implementations of the disclosure, content item serving system 110 may include a processor 112, a memory 114, and/or other components that facilitate the functions of content item serving system 110 described herein. In some implementations of the disclosure, processor 112 includes one or more processors configured to perform various functions of content item serving system 110. In some implementations of the disclosure, memory 114 includes one or more tangible (i.e., non-transitory) computer readable media. Memory 114 may include one or more instructions that when executed by processor 112 configures processor 112 to perform the functions of content item serving system 110.

In some implementations of the disclosure, metrics analysis system 120 may generate one or more reports that illustrate effectiveness of location-based content items delivered to mobile communication devices 102. A content item may be "effective" or otherwise successful based on whether the content item increases virtual accesses (such as web page visits) to a virtual location such as a web page, enhances virtual access duration, enhances click-through-rates (CTRs), and/or otherwise causes increased sales or increased exposure of goods/services. The one or more reports may be accessed using client device 104.

In some implementations of the disclosure, metrics analysis system 120 may receive distance information and virtual information. The distance information may indicate a distance between mobile communication device 102 and a physical location of an entity such as a retailer. The virtual information may indicate a virtual access by mobile communication device 102 to a virtual location of the entity. The virtual location may include online content such as a web page or other electronic content of the entity that can be accessed by mobile communication device 102. The virtual access may include an access, such as a web page visit, by mobile communication device 102 to the virtual location.

In some implementations of the disclosure, metrics analysis system 120 may generate an association between the distance and the virtual access. In other words, metrics analysis system 120 may associate a location of mobile communication device 102 with the virtual access that occurred. In this manner, based on the association, metrics analysis system 120 may determine a distance from the physical location of the entity when mobile communication device 102 accessed the virtual location of the entity.

In some implementations of the disclosure, metrics analysis system 120 may generate a report that includes an indication of the distance information and at least a portion of the virtual information based on the determined distance from the physical location. The indication of the distance information may include a range of distances (such as, for example, "less 100 meters from the physical location"), the actual distance from the physical location (such as "50 meters from the physical location"), and/or other indication that conveys the determined distance. In this manner, metrics analysis system 120 may achieve reporting capabilities that allow an entity to determine the effect of distance on success of content items delivered to mobile communication devices 102. For example, metrics analysis system 120 may be used to determine whether content items communicated to mobile communication devices 102 are more effective when communicated at closer distances, measured via the determined distance from the physical location, than farther distances. In other words, metrics analysis system 120 may provide metrics to determine whether content items are more effective at increasing virtual accesses to a virtual location when mobile communication devices 102 are closer to a physical location than farther from the physical location.

In some implementations of the disclosure, the distance information includes a plurality of distances each corresponding to different distances between different mobile communication devices and the physical location. The different distances may include ranges of distances so that multiple data points may be included in the report. In other words, metrics analysis system 120 may generate different distance bins such, but not limited to, "<100 meters from physical location"; "100-500 meters from physical location"; "500 meters-1 kilometer from physical location"; and/or other distance bins. For each distance bin, metrics analysis system 120 may include a number of virtual accesses and/or other metrics of effectiveness of content items. In this manner, the effect of different distances on effectiveness of content items may be included.

In some implementations of the disclosure, metrics analysis system 120 includes revenue information based on the different distances. The revenue information may include a total revenue derived from or otherwise attributable to location-based content items delivered to communication devices 102. In some implementations, the revenue information may include fees, paid by entities such as content providers, for presenting the location-based content items. In some implementations, the revenue information may include click-through rates, conversion rates, and/or other information that indicates revenue generated by entities such as content providers as a result of the location-based content item being displayed.

In some implementations of the disclosure, the revenue information includes a revenue value associated with one or more of the plurality of distances. In these implementations, metrics analysis system 120 may display the revenue value with the associated one or more of the plurality of distances. In this manner, the effect of different distances on revenue may be analyzed or otherwise determined.

In some implementations of the disclosure, the virtual information may include, but is not limited to, a number of virtual accesses to the virtual location, a click-thru-rate, a number of pages visited during the virtual access, a bounce rate, a percent of new visits, and an average duration of the virtual access. By including these and other virtual information, metrics analysis system 120 may generate reports that display various metrics of effectiveness of content items.

According to various implementations of the disclosure, metrics analysis system 120 may include a processor 112, a memory 114, and/or other components that facilitate the functions of metrics analysis system 120 described herein. In some implementations of the disclosure, processor 112 includes one or more processors configured to perform various functions of metrics analysis system 120. In some implementations of the disclosure, memory 114 includes one or more tangible (i.e., non-transitory) computer readable media. Memory 114 may include one or more instructions that when executed by processor 112 configures processor 112 to perform the functions of metrics analysis system 120.

Mobile communication device 102 may include a mobile device such as a cellular telephone, a personal digital assistant, a tablet computing device, and/or other mobile communication device on which content items can be displayed. However, as would be appreciated, instead of or in addition to mobile communication device 102, various functions described herein may be applied to other devices such as a desktop computer or other computing devices that are not necessarily portable but can be located using one or more location-based information described herein. Client device 104 may include devices that can access reports and/or virtual locations described herein. For example, client device 104 may include a mobile communication device as described herein, a desktop computer and/or other computing devices.

Figure 1B:
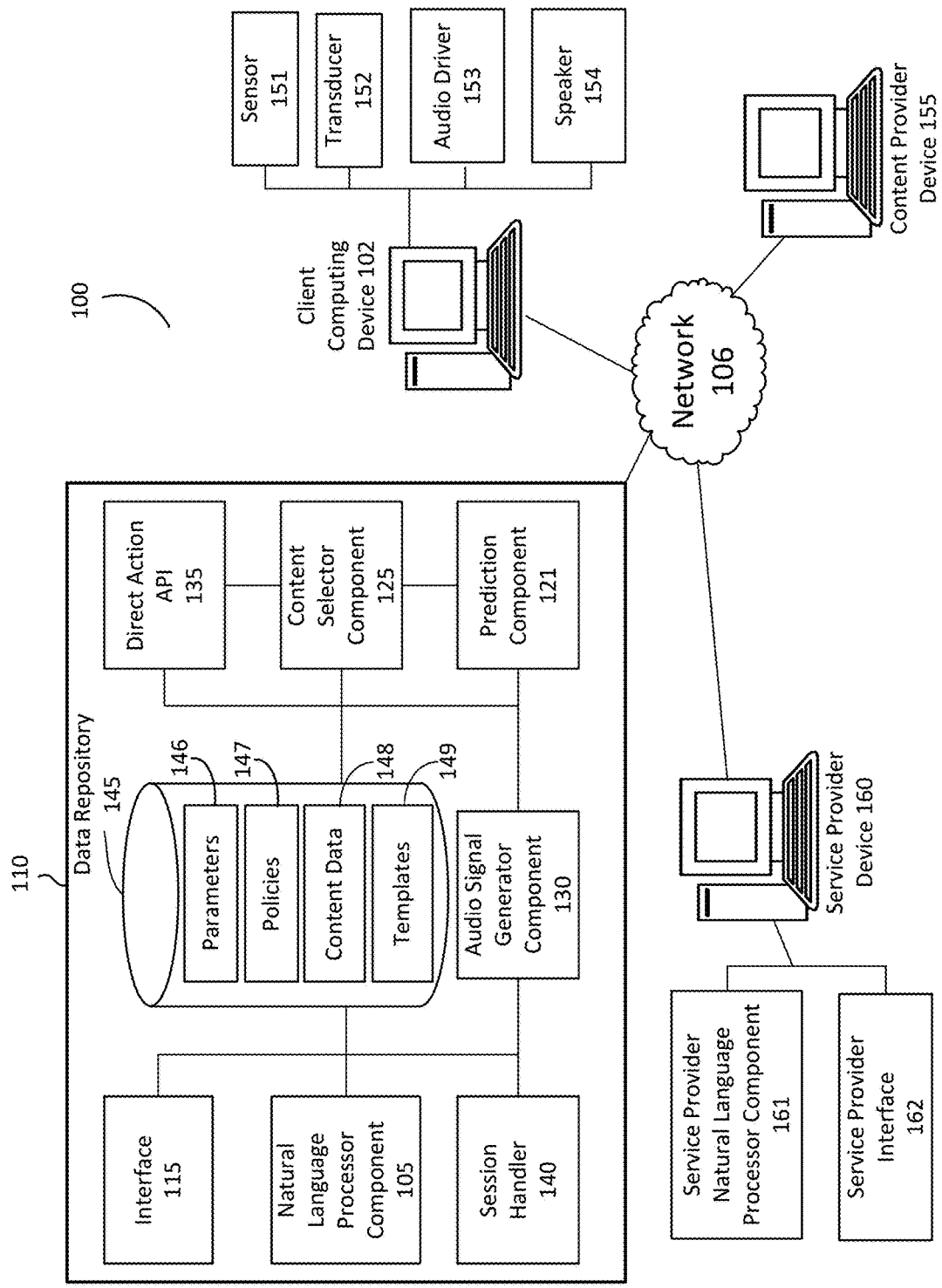
FIG. 1B depicts a system to optimize processing of sequence dependent operations in a voice activated computer network environment, according to various implementations of the disclosure.

FIG. 1B depicts an example system 100 to optimize processing of sequence dependent operations in a voice activated data packet (or other protocol) based computer network environment. The system 100 can include at least one data processing system 110. The data processing system 110 can be a component of the content item serving system 110. The data processing system 110 can include at least one server having at least one processor. For example, the data processing system 110 can include a plurality of servers located in at least one data center or server farm. The data processing system 110 can determine, from an audio input signal a request and a trigger keyword associated with the request. Based on the request and trigger keyword the data processing system 110 can determine or select a thread than includes a plurality of sequence dependent operations, and can select content items (and initiate other actions as described herein) in an order that does not match the sequence of dependent operations, for example as part of a voice activated communication or planning system. The content items can include one or more audio files that when rendered provide an audio output or acoustic wave. The content items can include other content (e.g., text, video, or image content) in addition to or instead of audio content. For example the content items can include text or image files, or combinations thereof, that do not include audio files and that do not render audio output.

The data processing system 110 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 110 can include servers in a data center that are stored in one or more high-density rack systems, along with associated storage systems, located for example in an enterprise data center. The data processing system 110 with consolidated servers in this way can improve system manageability, data security, the physical security of the system, and system performance by locating servers and high performance storage systems on localized high performance networks. Centralization of all or some of the data processing system 110 components, including servers and storage systems, and coupling them with advanced system management tools allows more efficient use of server resources, which saves power and processing requirements and reduces bandwidth usage.

The data processing system 110 can include at least one natural language processor (NLP) component 105, at least one interface 115, at least one prediction component 121, at least one content selector component 125, at least one audio signal generator component 130, at least one direct action application programming interface (API) 135, at least one session handler component 140, and at least one data repository 145. The NLP component 105, interface 115, prediction component 121, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 145 and with other computing devices (e.g., the client computing device 102, the content provider computing device 155, or the service provider computing device 160) via the at least one computer network 106. The network 106 can include computer networks such as the internet, local, wide, metro or other area networks, intranets, satellite networks, other computer networks such as voice or data mobile phone communication networks, and combinations thereof.

The network 106 can include or constitute a display network, e.g., a subset of information resources available on the internet that are associated with a content placement or search engine results system, or that are eligible to include third party content items as part of a content item placement campaign. The network 106 can be used by the data processing system 110 to access information resources such as web pages, web sites, domain names, or uniform resource locators that can be presented, output, rendered, or displayed by the client computing device 102. For example, via the network 106 a user of the client computing device 102 can access information or data provided by the content provider computing device 155 or the service provider computing device 160.

The network 106 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 106 can include a wireless link, such as an infrared channel or satellite band. The topology of the network 106 may include a bus, star, or ring network topology. The network 106 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 102, the content provider computing device 155, and the service provider computing device 160 can each include at least one logic device such as a computing device having a processor to communicate with each other or with the data processing system 110 via the network 106. The client computing device 102, the content provider computing device 155, and the service provider computing device 160 can each include at least one server, processor or memory, or a plurality of computation resources or servers located in at least one data center. The client computing device 102, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 102 can include at least one sensor 151, at least one transducer 152, at least one audio driver 153, and at least one speaker 154. The sensor 151 can include a microphone or audio input sensor. The transducer 152 can convert the audio input into an electronic signal. The audio driver 153 can include a script or program executed by one or more processors of the client computing device 102 to control the sensor 151, the transducer 152 or the audio driver 153, among other components of the client computing device 102 to process audio input or provide audio output. The speaker 154 can transmit the audio output signal.

The client computing device 102 can be associated with an end user that enters voice queries as audio input into the client computing device 102 (via the sensor 151) and receives audio output in the form of a computer generated voice that can be provided from the data processing system 110 (or the content provider computing device 155 or the service provider computing device 160) to the client computing device 102, output from the speaker 154. The computer generated voice can include recordings from a real person or computer generated language.

The content provider computing device 155 can provide audio based content items for display by the client computing device 102 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 155 can also provide audio based content items (or other content items) to the data processing system 110 where they can be stored in the data repository 145. The data processing system 110 can select the audio content items and provide (or instruct the content provider computing device 155 to provide) the audio content items to the client computing device 102. The audio based content items can be exclusively audio or can be combined with text, image, or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 102 (via the data processing system 110 or bypassing the data processing system 110) to create a back-and-forth real-time voice or audio based conversation (e.g., a session) between the client computing device 102 and the service provider computing device 160. For example, the service provider interface 162 can receive or provide data messages to the direct action API 135 of the data processing system 110. The service provider computing device 160 and the content provider computing device 155 can be associated with the same entity. For example, the content provider computing device 155 can create, store, or make available content items for a car sharing service, and the service provider computing device 160 can establish a session with the client computing device 102 to arrange for a delivery of a taxi or car of the car share service to pick up the end user of the client computing device 102. The data processing system 110, via the direct action API 135, the NLP component 105 or other components can also establish the session with the client computing device, including or bypassing the service provider computing device 160, to arrange for example for a delivery of a taxi or car of the car share service.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 102 and the data processing system 110 (or the service provider computing device 160). The content data 148 can include content items for audio output or associated metadata, as well as input audio messages that can be part of one or more communication sessions with the client computing device 102.

The system 100 can optimize processing of sequence dependent operations in a voice activated data packet (or other protocol) environment. For example, the data processing system 110 can include or be part of a voice activated assistant service, voice command device, intelligent personal assistant, knowledge navigator, event planning, or other assistant program. The data processing system 110 can provide one or more instances of audio output for display from the client computing device 102 to accomplish tasks related to this input audio signal. The tasks can include, for example, communicating with the service provider computing device 160 or other third party computing devices to make dinner reservations or purchase movie tickets. For example, an end user can enter an input audio signal into the client computing device 102 of: "OK, I would like to go to go dinner and then a movie tonight."

The sequence dependent operations can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater. In this example, the second action in the sequence (watching the movie) is subsequent to and dependent on the first action (going out to dinner), and the third action (returning home) is subsequent to and dependent on the first action and the second action. The third action can be considered subsequent to and dependent on the second action, as having expressed an intent to do so, the data processing system 110 predicts that the end user would watch the movie in the theater before returning home as well.

The data processing system 110 can include an application, script or program installed at the client computing device 102, such as an app to communicate input audio signals to the interface 115 of the data processing system 110 and to drive components of the client computing device to render output audio signals. The data processing system 110 can receive data packets or other signal that includes or identifies an audio input signal. For example, the data processing system 110 can execute or run the NLP component 105 to receive the audio input signal.

The NLP component 105 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 105 can match the text to words that are associated, for example via training across users or through manual specification, with actions that the data processing system 110 can serve.

The audio input signal can be detected by the sensor 151 (e.g., a microphone) of the client computing device. Via the transducer 152, the audio driver 153, or other components the client computing device 102 can provide the audio input signal to the data processing system 110 (e.g., via the network 106) where it can be received (e.g., by the interface 115) and provided to the NLP component 105 or stored in the data repository 145 as content data 148.

The NLP component 105 can obtain the input audio signal. From the input audio signal, the NLP component 105 can identify at least one request or at least one trigger keyword corresponding to the request. The request can indicate intent or subject matter of the input audio signal. The trigger keyword can indicate a type of action likely to be taken. For example, the NLP component 105 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The prediction component 121 (or other mechanism of the data processing system 110) can determine, based on the request or the trigger keyword, at least one thread associated with the input audio signal. The thread can indicate a set of sequence dependent operations, such as a series of actions. The thread can include any two or more actions, such as a first action, a second action, and a third action. For example, the input audio signal "OK, I would like to go to go dinner and then a movie tonight" can include at least one request indicating an interest to attend dinner and a movie, and at least one trigger keyword, e.g., "go" indicating a need for transportation. The prediction component 121 can identify a thread with at least three actions, such as a dinner action (first action), a movie action (second action), and a transportation home action (third action). In this example, from the request or the trigger keyword the prediction component 121 predicts, estimates, or otherwise determines the three actions. The thread can include other actions, such as an initial transport to dinner action.

The data processing system 110 or component thereof such as the prediction component 121 can determine that the actions of the thread are sequence dependent operations. For example, the prediction component can determine that the second action of watching the movie is subsequent to the first action of eating dinner, and that the third action of travelling home from the movie theater is after the second action of watching the movie. The prediction component 121 can access the parameters 146 or policies 147 in the data repository 145 to determine or otherwise estimate the order of the sequence dependent actions. For example, the parameters 146 or policies 147 could indicate that a transport action (e.g., a taxi home) can occur after an event action (e.g., watching a movie).

The content selector component 125 can obtain indications of any of the actions of the thread. For example, the prediction component 121 can directly or indirectly (e.g., via the data repository 145) provide an indication of the third (or any other) action to the content selector component 125. The content selector component 125 can obtain this information from the data repository 145, where it can be stored as part of the content data 148. The indication of the third action can inform the content selector component 125 of a need for transportation from the location of the movie theater to a location as determined or indicated by the client computing device 102, such as a ride to an end destination.

The content selector component 125 can obtain indications of a later action in the thread prior to the occurrence of at least one earlier action. For example, the content selector component 125 can receive an indication of the third action (e.g., a need for a ride from the movie theater) before the movie plays in the theater (second action), or before the person who input the input audio signal into the client computing device 102 eats dinner at the restaurant (first action). The content selector component 125 can obtain indications of at least one action of the thread before completion of at least one action of the thread.

From the information received by the content selector component 125, e.g., an indication of the third action before occurrence of at least one prior action in the sequence dependent thread, the content selector component 125 can identify at least one content item. The content item can be responsive or related to the third action. For example, the content item can include an audio message offering services of a car share company, responsive to the third action that indicates a transportation need. The content selector component 125 can query the data repository 145 to select or otherwise identify the content item, e.g., from the content data 148. The content selector component 125 can also select the content item from the content provider computing device 155. For example responsive to a query received from the data processing system 110, the content provider computing device 155 can provide a content item to the data processing system 110 (or component thereof) for eventual output by the client computing device 102.

The audio signal generator component 130 can generate or otherwise obtain an output signal that includes the content item responsive to the third action. For example, the data processing system 110 can execute the audio signal generator component to generate or create an output signal corresponding to the content item. The interface 115 of the data processing system 110 can provide transmit one or more data packets that include the output signal via the computer network 106 to the client computing device 102. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

For example the data processing system 110 can provide the output signal from the data repository 145 or from the audio signal generator component 130 to the client computing device 102. The data processing system 110 can also instruct, via data packet transmissions, the content provider computing device 155 or the service provider computing device 160 to provide the output signal to the client computing device 102. The output signal can be obtained, generated, transformed to or transmitted as one or more data packets (or other communications protocol) from the data processing system 110 (or other computing device) to the client computing device 102.

In this example the content selector component 125 skips to a later (e.g., third) action in a set of sequence dependent operations to select a content item for the third action prior to occurrence (and prior to an immediate need) for activity corresponding to the third action. By skipping to a later sequenced action, the data processing system 110 is not required to process information related to the first action or the second action to select content items for those actions. This reduces processor utilization, power consumption and bandwidth from data transmissions that would otherwise be associated with selecting a content item (for the first action) or a content item (for the second action) prior to selecting the content item for the third action.

The content selector component 125 can select the content item for the (subsequent or later) third action as part of a real-time content selection process. For example, the content item can be provided to the client computing device for transmission as audio output in a conversational manner in direct response to the input audio signal. The real-time content selection process to identify the content item and provide the content item to the client computing device 102 can occur within one minute or less from the time of the input audio signal and be considered real-time.

The output signal that corresponds to the content item, for example obtained or generated by the audio signal generator component 130 transmitted via the interface 115 and the computer network 106 to the client computing device 102, can cause the client computing device 102 to execute the audio driver 153 to drive the speaker 154 to generate an acoustic wave corresponding to the output signal. The acoustic wave can include words of or corresponding to the content item for the third action. The output signal that corresponds to the content item can also include non-audio content items that render on the client computing device 102 that is the source of the input audio signal or on a different client computing device 102 (e.g., a wearable device computing device) as text or image messages that can render without audio elements.

The acoustic wave can be output from the client computing device 102 before the occurrence of the first action or the second action. For example, the acoustic wave can include the audio output of "Would you like a taxi waiting for you after the movie?" In this example, the data processing system 110 obtains the input audio signal of, for example, "OK, I would like to go to go dinner and then a movie tonight." From this information the NLP component 105 identifies at least one request or at least one trigger keyword, and the prediction component 121 uses the request(s) or trigger keyword(s) to identify at least one thread. The thread includes a series of sequence dependent actions, e.g., a first dinner action, a second movie action, and a third transport home action. The prediction component 121 can determine (e.g., with at least a threshold level of confidence such as 75% confident) that these actions will occur in sequential order, where the end user of the client computing device 102 will first eat dinner, then after dinner go to a movie, then after dinner take transportation home or away from the movie theater. The content selector component 125 can, for example, bypass processing associated with content item selection for the first action and the second action and instead first selects a content item for the third action, e.g., a content item for a car share service to arrange for transport with a pick-up location of the movie theater. The data processing system 110 or component thereof such as the audio signal generator component 130 can provide the content item for the third action to the client computing device 102. The acoustic wave can be output from the client computing device 102 subsequent to the occurrence of the first action and before the occurrence of the second action, e.g., between prior actions in the thread.

The content item for the third item can render at least in part as an audio output from the client computing device 102 before the first action or the second action has occurred. For example, the output signal that includes the content item for the third action can render as a human or automated voice that states "Would you like a ride home from the movie theater?" The data processing system 110 can receive a response to the content item for the third action prior to occurrence of one, more than one, or all of the prior actions in the ordered sequence of actions. For example, the data processing system 110 can provide the content item for rendering and receive a response, e.g., via the interface 115, before the end user has gone to dinner or before the end user has watched the movie. The data processing system 110 can provide the output signal that includes the content item in direct or real-time response to the input audio signal of "OK, I would like to go to go dinner and then a movie tonight" so that the packet based data transmissions via the computer network 106 that are part of a communication session between the data processing system 110 and the client computing device 102 has the flow and feel of a real-time person to person conversation. This packet based data transmission communication session can also include the content provider computing device 155 or the service provider computing device 160.

The content selector component 125 can select content items provided in response to the third (or any non-first) action in the sequence dependent set of actions before selecting any content item for any prior action in the sequence. This avoids the need to process at least some of the data corresponding to the prior actions, which causes the third content item to be selected with a reduced number of processing operations than would occur if the content items were selected in an order that matches the order of the sequence of actions. Content items for the prior (e.g., first and second) actions may or may not be selected, for example after selection of the content item for the third action.

The content selector component 125 can select the content item (e.g., for the third action) based on at least one trigger keyword of the thread that indicates subject matter different than subject matter of the one or more requests of the same thread. For example, the requests of the thread responsive to "OK, I would like to go to go dinner and then a movie tonight" can indicate subject matter of a dinner request (first action), and subject matter of a movie request (second action). This subject matter does not indicate any transportation request. However, the NLP component 105 or the prediction component 121 (or other data processing system 110 components executing as part of the direct action API 135) can identify the trigger keyword "go" "go to" or "to go to" and can determine a transportation request (third action) based at least in part on the trigger keyword. Thus, the data processing system 110 can infer actions from the input audio signal that are secondary requests that are not the primary request or subject of the input audio signal.

The data processing system 110 can prevent or delay transmission of the output signal that includes the content item. For example, the interface 115 or a script executing via the direct action API 135 can prevent transmission of data packets that include the output signal corresponding to the content item until a triggering event. The triggering event can include expiration of a pre-determined time period, such as two hours or a time coinciding with occurrence of an earlier action in the thread, such as a scheduled end time of a movie. The triggering event can also include an authorization indication received by the data processing system 110 from the client computing device 102. The authorization indication can originate as a subsequent audio input associated with the thread but received by the data processing system subsequent to the input audio signal, a text-based or other non-audible signal, or can include an indication of a setting of the client computing device 102 that authorizes receipt by the client computing device 102 of content items.

The data processing system 110 can also delay transmission of the content item associated with a second or subsequent to second action of the thread to optimize processing utilization. For example, the data processing system 110 can delay content item transmission until an off-peak or non-peak period of data center usage, which results in more efficient utilization of the data center by reducing peak bandwidth usage, heat output or cooling requirements. The data processing system 110 can also initiate a conversion or other activity associated with the content item, such as ordering a car service, based on data center utilization rates or bandwidth metrics or requirements of the network 106 or of a data center that includes the data processing system 110.

The content items can correspond to the actions of the thread, and the content selector component 125 can select a content item for one, more than one, or all actions of the thread. The prediction component 121 can identify the sequence dependent thread of actions of, for example, "dinner" (first action) "movie" (second action) and "transport from movie location" (third action). The direct action API 135 can execute programs or scripts, for example from the NLP component 105, the prediction component 121, or the content selector component 125 to identify content items for one or more of these actions. The direct action API 135 can execute a specified action to satisfy the end user's intention, as determined by the data processing system 110.

Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 102 to ask the end user questions such as the intended destination of a requested taxi. The direct action API 135 can determine necessary parameters and can package the information into an action data structure, which can then be sent to another component such as the content selector component 125 or to the service provider computing device 160 to be fulfilled.

The direct action API 135 of the data processing system 110 can generate, based on the request or the trigger keyword, data structures for the actions of the thread. The action data structures can be generated responsive to the request. The action data structure can be included in the messages that are transmitted to or received by the service provider computing device 160. Based on the request parsed by the NLP component 105, the direct action API 135 can determine to which of a plurality of service provider computing devices 160 the message should be sent. For example, if an input audio signal includes "order a taxi," the NLP component 105 can identify the trigger word "order" and the request for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location and a destination location. The direct action API 135 can retrieve a template 149 from the repository 145 to determine which fields to include in the action data structure. The direct action API 135 can retrieve content from the repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}.

For example the content item for the third action can be provided for rendering at the client computing device 102 as an audio response that states "Would you like a ride home from the movie theater?" in response to the audio input signal. Subsequent or prior to this rendering, the data processing system 110 can select or provide a content item, e.g., "the Italian restaurant downtown has an opening for 7 pm tonight?" for the first action (dinner), and can select or provide another content item, e.g., "would you like tickets to the 9 pm movie at the downtown theater?" for the second action (movie). The data processing system 110 can provide (which includes instructing the content provider computing device 155 to provide) these content items responsive to the input audio signal for rendering by the client computing device 102 as audio output content items. The data processing system 110, via the interface 115, can select or provide these content items in any order to the client computing device 102. For example, the content item for the third (e.g., last) action can be selected or provided first, before content items corresponding to other, earlier actions of the thread.

The data processing system 110 can receive a response to the content item "would you like a ride home from the movie theater?" The response can include an input audio signal, e.g., "yes please" that was entered into the client computing device 102 by the end user and received by the data processing system 110. Based on this response, the direct action API 135 can communicate with the service provider computing device 160 (that can be associated with the content item, such as a car share company) to order a taxi or ride share vehicle for the location of the movie theater at the time the movie ends. The data processing system 110 can obtain this location or time information as part of the data packet (or other protocol) based data message communication with the client computing device 102, from the data repository 145, or from other sources such as the service provider computing device 160 or the content provider computing device 155. Confirmation of this order (or other conversion) can be provided as an audio communication from the data processing system 110 to the client computing device 102 in the form of an output signal from the data processing system 110 that drives the client computing device 102 to render audio output such as, "great, you will have a car waiting for you at 11 pm outside the theater." The data processing system 110, via the direct action API 135, can communicate with the service provider computing device 160 to confirm the order for the car.

The data processing system 110 can obtain the response (e.g., "yes please") to the content item ("would you like a ride home from the movie theater?") and can route a packet based data message to the service provider NPL component 161 (or other component of the service provider computing device). This packet based data message can cause the service provider computing device 160 to effect a conversion, e.g., to make a car pick up reservation outside the movie theater. This conversion—or confirmed order—(or any other conversion of any other action of the thread) can occur prior to completion of one or more actions of the thread, such as prior to completion of the movie, as well as subsequent to completion of one or more actions of the thread, such as subsequent to dinner.

Based on a response to a content item for a subsequent action in the thread, such as the response "yes please" to the content item "would you like a ride home from the movie theater" for the third and last action in a sequence dependent thread, the data processing system 110 can initiate a conversion or action. This can occur before the end user has begun any activities associated with the thread, e.g., before dinner or before the movie is over. Processors of the data processing system 110 can invoke the direct action API 135 to execute scripts that order a car from a car share service. The direct action API 135 can obtain content data 148 (or parameters 146 or policies 147) from the data repository 145, as well as data received with end user consent from the client computing device 102 to determine location, time, user accounts, logistical or other information in order to reserve a car from the car share service. Using the direct action API 135, the data processing system 110 can also communicate with the service provider computing device 160 to complete the conversion by in this example making the car share pick up reservation.

The direct action API 135 can initiate the conversion or activity to accomplish an action of the thread at any time during a time period from receipt by the data processing system 110 of the first input audio signal associated with the thread, (e.g., "OK, I would like to go to go dinner and then a movie tonight") until a threshold time period subsequent to completion of one of the actions of the thread, (e.g., until 15 minutes after the end of the second action of watching the movie). The data processing system 110 can also determine the end of this time period based on other factors, such as an indication that the end user has completed the actions of the thread, e.g., has returned home or is no longer located at the movie theater. The data processing system 110 can also obtain an indication from the client computing device 102 (a data message transmitted via the network 106) that the thread is cancelled or dormant or that the end user has cancelled or completed actions of the thread.

The direct action API 135 can initiate the conversion or activity to accomplish an action of the thread based on completion or time of completion of other actions of the thread. For example, the data processing system 110 can order a good or service (car share pick-up) directly or by communicating with the service provider computing device 160 within a threshold time period of a conclusion of a prior action in the thread. Within 5 minutes (or other time period) prior or subsequent to the scheduled or actual conclusion of the movie (second action), the data processing system 110 can confirm or order a car share service to send a car to pick up the end user at the movie theater (subsequent, third action). This can occur in the absence of input received from the end user computing device 102 during this time period, or responsive to a prompt received from the end user computing device 102 during this time period.

The direct action API 135 can initiate the conversions or other activity associated with the sequence dependent operations of the thread in any order. For example, the direct action API 135 (or other data processing system 110 component) can initiate activity corresponding to a final action (e.g., the third action in a three action thread such as ordering a taxi) prior to initiating activity corresponding to an earlier thread in the sequence, (e.g., prior to making a dinner reservation or prior to ordering movie tickets). In this example the data processing system 110 initiates activity for an earlier (e.g., second) action subsequent to initiation of activity for the later (e.g., third) action.

The content selector component 125 can identify, select, or obtain multiple content items resulting from a multiple content selection processes. The content selection processes can be real-time, e.g., part of the same conversation, communication session, or series of communications sessions between the data processing system 110 and the client computing device 102 that involve a thread. The conversation can include asynchronous communications separated from one another by a period of hours or days, for example. The conversation or communication session can last for a time period from receipt of the first input audio signal until an estimated or known conclusion of a final action of the thread, receipt by the data processing system 110 of an indication of a termination of the thread. This can be referred to as the active time period of the thread. For example, for a thread with three actions (e.g., dinner, move, and transport home), the content selector component 125 can select at least one content item for each action. The content item selector component 125 can run or obtain results from a different content selection process for each action. In the content selection processes the content provider computing device 160 can set forth content items for selection by the content selector component 125. For a thread with at least three actions, the content item selector component can select or otherwise identify a first content item for the first action via a first content selection process, a second content item for the second action via a second content selection process, and a third content item for the third action via a third content selection process. The data processing system 110 that provides these content items for rendering by the client computing device 102 during the active time period of the thread can be considered to be operating in real-time. In this example the content selection processes and rendering of the content items occurs in real time.

The data processing system 110 can cancel actions associated with content items. For example, after ordering the car service the end user may watch the movie but then decide to walk home, or to have desert after the movie instead of taking a car home. An app or other program executing at the client computing device 102 as part of the data processing system 110 can receive an input audio signal of "cancel my ride home". The NLP component 105 can receive this input audio signal, for example as one or more packet based data messages, and can determine that this input audio signal relates to a pre-existing thread (e.g., dinner, movie, transport home) and is part of the same conversation or communication. For example, the NLP component 105 (or other data processing system 110 component) can evaluate time data, location data and pre-existing thread data such as past, present, or scheduled actions of a thread from the content data 148 of the data repository 145 to determine that an input audio signal relates to a pre-existing thread. Based, for example, on the request "ride" or the trigger keyword "cancel" the NLP component 105 can determine that the input audio signal "cancel my ride home" relates to the content item "would you like a ride home from the movie theater?" that corresponds to the third action of a pre-existing thread. The direct action API 135 (or other component) can cause the data processing system 110 to communicate via the interface 115 with the service provider computing device 160 to cancel the order for the taxi or car share service to have a car waiting for the end user outside the movie theater upon conclusion of the movie.

The NLP component 105 can receive the data packet or other protocol based message to cancel an action of the thread prior to or subsequent to completion of any action of the thread. The NLP component 105 can receive from the client computing device 102 (or obtain from the data repository 145) a data message (inbound audio signal) to cancel an action of the thread within a time interval triggered by an earlier action of the thread. For example, in a sequence dependent thread with three actions, dinner, movie, transport, the data processing system 110 can receive the transport cancellation data message within 5 minutes (or other time period) of the conclusion of the movie. The data processing system 110 can prompt for confirmation of a product or service related to an action of the thread. For example, during a time period between the first action and the second action (e.g., after dinner and before the movie) the data processing system 110 can transmit a data message to the client computing device 102 that, when rendered at the client computing device 102 outputs the audio or text message stating "just confirming that you still want a car waiting for you after the movie." The data processing system 110 can receive a response, e.g., "yes, confirmed" or "no, cancel the car". The direct action API 135 can execute scripts to process this information and can communicate with the service provider computing device 160 to indicate the confirmation or the cancellation.

Figure 1C:
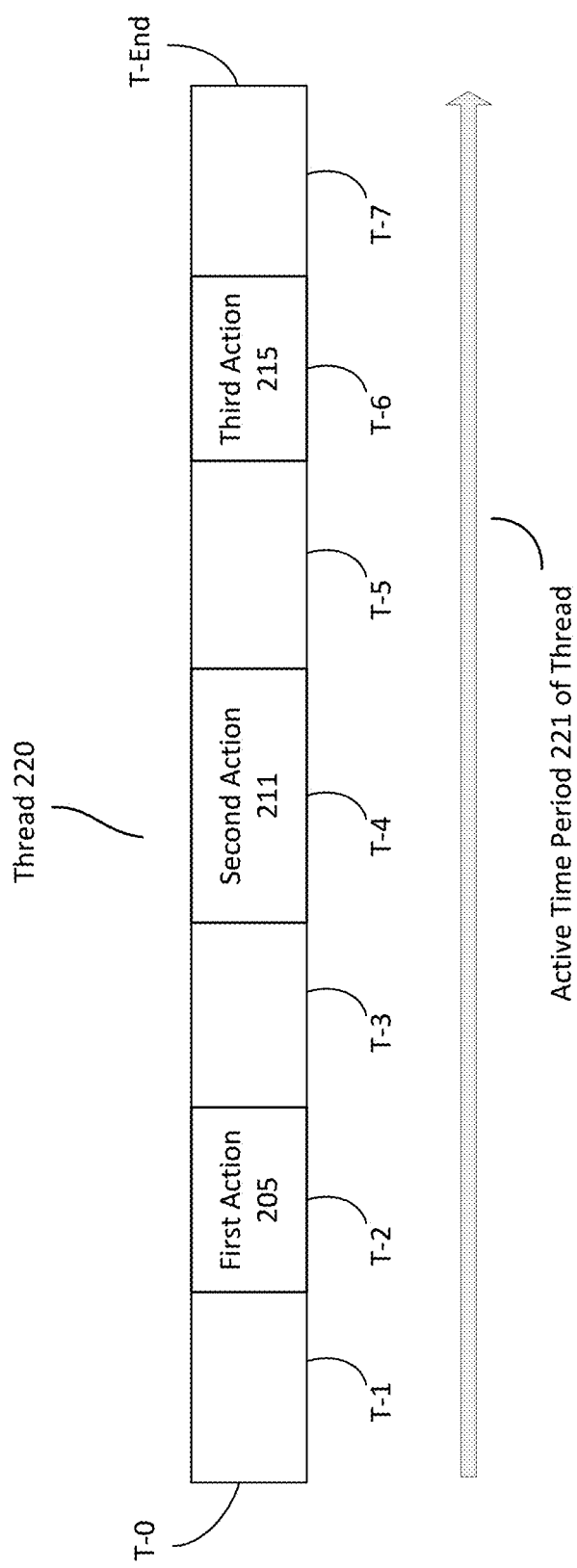
FIG. 1C depicts a functional diagram of a thread including sequence dependent actions, according to various implementations of the disclosure.

FIG. 1C depicts a functional diagram of a thread 220 having sequence dependent actions including a first action 205, a second action 211, and a third action 215. The thread 220 can be determined by components of the data processing system 110 such as the prediction component 121. The data processing system 110 can receive the input audio signal, for example as data packets, via the interface 115 at time T-0

(T-zero). The data processing system 110 can determine that time T-0 is the beginning of the active time period 221 of the thread 220.

Based on requests or trigger keywords obtained from the input audio signal (e.g., "OK, I would like to go to go dinner and then a movie tonight"), the prediction component can identify a plurality of sequence dependent actions such as the first action 205 (e.g., dinner), the second action 211 (e.g., movie), and the third action 215 (e.g., ride home after the movie) that are predicted to occur in this order and where at least one action is dependent on the occurrence of at least one prior action. For example the third action 215 (a ride home from the movie theater) is dependent on occurrence of the second action (the end user arriving at the movie theater to watch the movie).

The data processing system 110 and components such as the content selector component 125 and the interface 115 can provide content items for rendering as audio output by the client computing device 102 during the active time period 221 of the thread 220. For example, the data processing system 110 can select and provide a content item (e.g., "would you like a ride home from the movie theater?") for the third action 215 during time period T-1, which is the time period from the beginning of the active time period 221 until the beginning of the first action 205 (e.g., a time of a dinner reservation). The data processing system 110 can select or provide any content items associated with any actions at any time during the active time period 221. For example, the first content item (for the third action 215) or a different content item for the third action 215 (e.g., a movie recommendation or an offer to purchase movie tickets) can be provided during the time period T-1 or any other time period of the active time period 221. The data processing system 110 can also determine that content items have timed out, and will not provide them for any further renderings during part of the active time period T1. For example, the data processing system 110 can determine not to provide a content item for the first action 205 (e.g., dinner at time T-2) after the second action 211 (e.g., movie at time T-4) is determined by the data processing system 110 to have started. In this example, the content item for the first action 205 can be provided to the client computing device at between time T-1 (before the first action 205) and T-3 between the first action 205 and the second action 211).

At least one content item for the third action 215 (e.g., ride home) can still be provided during times T-1 through T-6, and even during time T-7, e.g., a period after the data processing system 110 determines that the movie is over but the end user elects to indicate to the data processing system 110 that the end user remains out for the evening. During the time period T-5, between the second action 211 and the third action 215, or any other time period of the active time period 221 such as T-6 (during the third action 215) or T-7 (after the third action 215), the data processing system 110 can provide content items related to the third action 215 to remarket, or prompt for confirmation of an action such as confirmation of a reserved car of a car share service.

Figure 2:
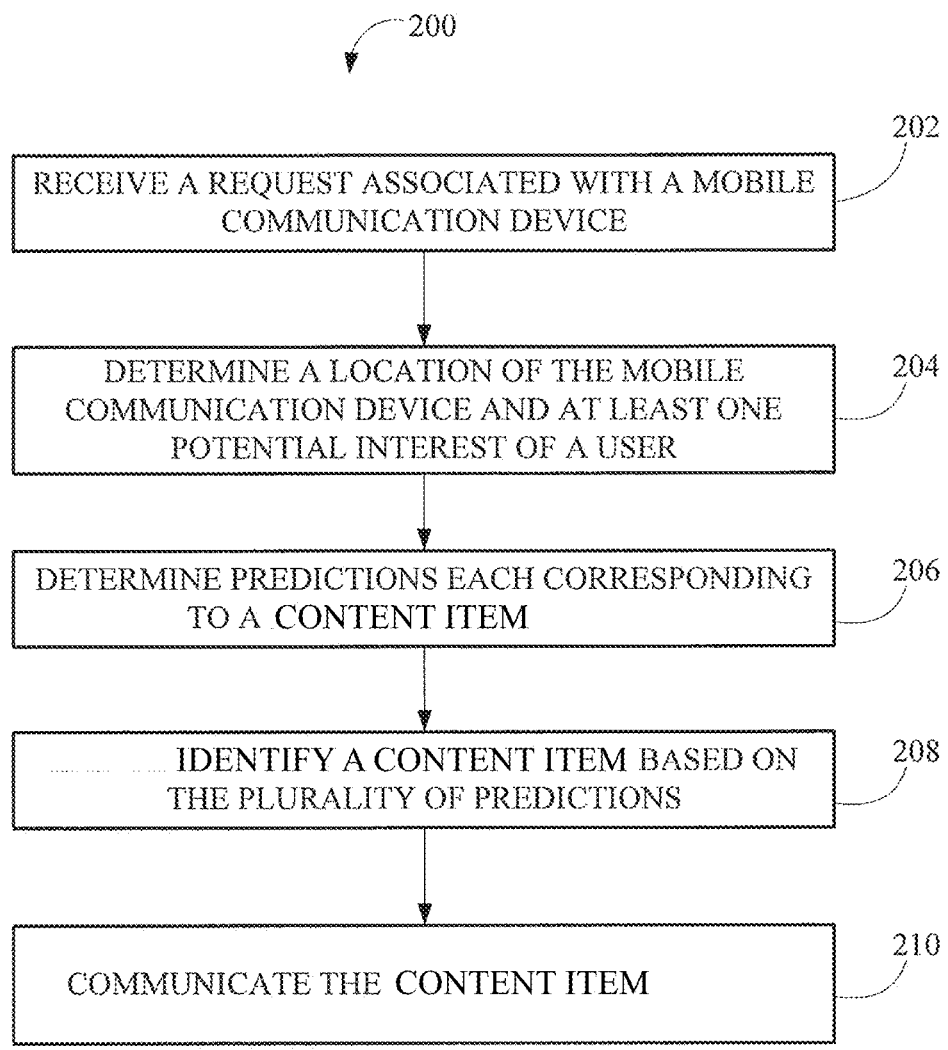
FIG. 2 is a flow diagram illustrating an example process of communicating location-based content items to mobile communication devices, according to various implementations of the disclosure.

FIG. 2 is a flow diagram illustrating an example process 200 of communicating location-based content items to mobile communication devices, according to various implementations of the disclosure. The various processing operations and/or data flows depicted in FIG. 2 (and in the other drawing figures) are described in greater detail herein. The described operations for a flow diagram may be accomplished using some or all of the system components described in detail above and, in some implementations of the disclosure, various operations may be performed in different sequences. According to various implementations of the disclosure, additional operations may be performed along with some or all of the operations shown in the depicted flow diagrams. In some implementations, one or more operations may be performed simultaneously. Accordingly, the operations as illustrated (and described in greater detail below) are examples by nature and, as such, should not be viewed as limiting.

In an operation 202, process 200 may receive a request associated with a mobile communication device (such as mobile communication device 102). The request may include a request for a content item. For example, a user of the mobile communication device may input one or more search keywords to execute a search. The search may include an Internet search, a search of the hard-drive of the device, or other search. The search may cause an application executing on the mobile communication device to request a content item.

For instance, an Internet browser submitting a search to a web search engine may cause the request for the content item. In another example, the user of the mobile communication device may interact with an application such as a gaming application, location-based service application, or other application executing on the mobile communication device. The interaction, such as a logon, initialization, or other action associated with the application may cause the application to request the content item. In other words, in some implementation of the disclosure, the request associated with the mobile communication device may include a request for a content item that originates from a search request, an application executing on the mobile communication device, or other information associated with the mobile communication device.

In an operation 204, in response to the request, process 200 may determine a location of the mobile communication device and at least one potential interest of a user of the mobile communication device. In some implementations of the disclosure, the location may be determined based on location information communicated from the mobile communication device for the purpose of locating the device (such as geographic coordinates communicated by the device when the user has granted location-based information to be communicated). In some implementations of the disclosure, the location may be determined based on location-based information associated with the mobile communication device but not necessarily communicated for the purpose of locating the device. Such location-based information may include, for example, an IP address of the mobile communication device and/or IP address of a carrier of the mobile communication device.

In some implementations of the disclosure, the potential interest of the user may include a determination of what may interest a user based on interest-based information such as, for example, search histories, web browsing histories, content items that were selected by the user, and/or other information that may indicate an interest of the user. In some implementations of the disclosure, the potential interest may be based on subject-matter with varying degrees of specificity. For example, the potential interest may be general, such as a general interest in sports; specific, such as a specific interest in golf equipment; and/or fine-grained, such as an interest in a particular brand of golf equipment. In this example, the user may access a number of sports-related web pages over a period of time. More specifically, the user may access a number of golf-related web pages and visit a particular golf equipment provider's website. This history of web page visits may indicate that the user is potentially interested in sports, more particularly interested in golf, and even more particularly interested in a particular golf equipment manufacturer.

In some implementations of the disclosure, the user may access these virtual locations using the mobile communication device. The history of these accesses may be stored at the mobile communication device or at a location remote from the device. In some implementations of the disclosure, the user may access these virtual locations using a remote device, such as client device 104, remote from the mobile communication device. In these implementations, the user may be associated with the mobile communication device (via a user profile, a user identifier, or other association) so that process 200 may correlate the potential interests of the user with the location of the mobile communication device. In other words, a user's web browsing history (using the mobile communication device and/or other device) may be combined with the location of the user's mobile communication device to identify content items to be communicated to the user's mobile communication device.

In some implementations of the disclosure, the potential interest may be based on types (i.e., content) of content items. For example, the user may be more interested in coupons than general sale announcements and/or the user may be more interested in walking directions than telephone call links. In this manner, process 200 may determine both the location of the user and potential interests (at various levels of specificity and types) of the user.

In an operation 206, process 200 may determine, based on the location of the mobile communication device and the at least one potential interest, predictions each corresponding to a content item. Each prediction may indicate a probability that a corresponding content item will be selected by a user of the mobile communication device. In other words, using both the location of the user (as measured by the location of the mobile communication device) and the interest of the user, process 200 may identify a likelihood that a content item will be selected by the user. In the foregoing example, a content item from a sporting goods retailer may be more likely to be selected by the user than a content item from a bakery. Also in the foregoing example, a content item from a sporting goods retailer that has a store nearby the user may be more likely to be selected by the user than a sporting goods retailer that has a store that is far from the user.

In an operation 208, process 200 may identify a content item from among the plurality of content items based on the plurality of predictions. In other words, based on the probability or likelihood of being selected by the user, process 200 may identify one or more content items. For example, process 200 may identify a content item associated with the sporting goods retailer that has a store nearby the user. In an operation 210, process 200 may communicate the content item to be displayed at the mobile communication device.

Figure 3:
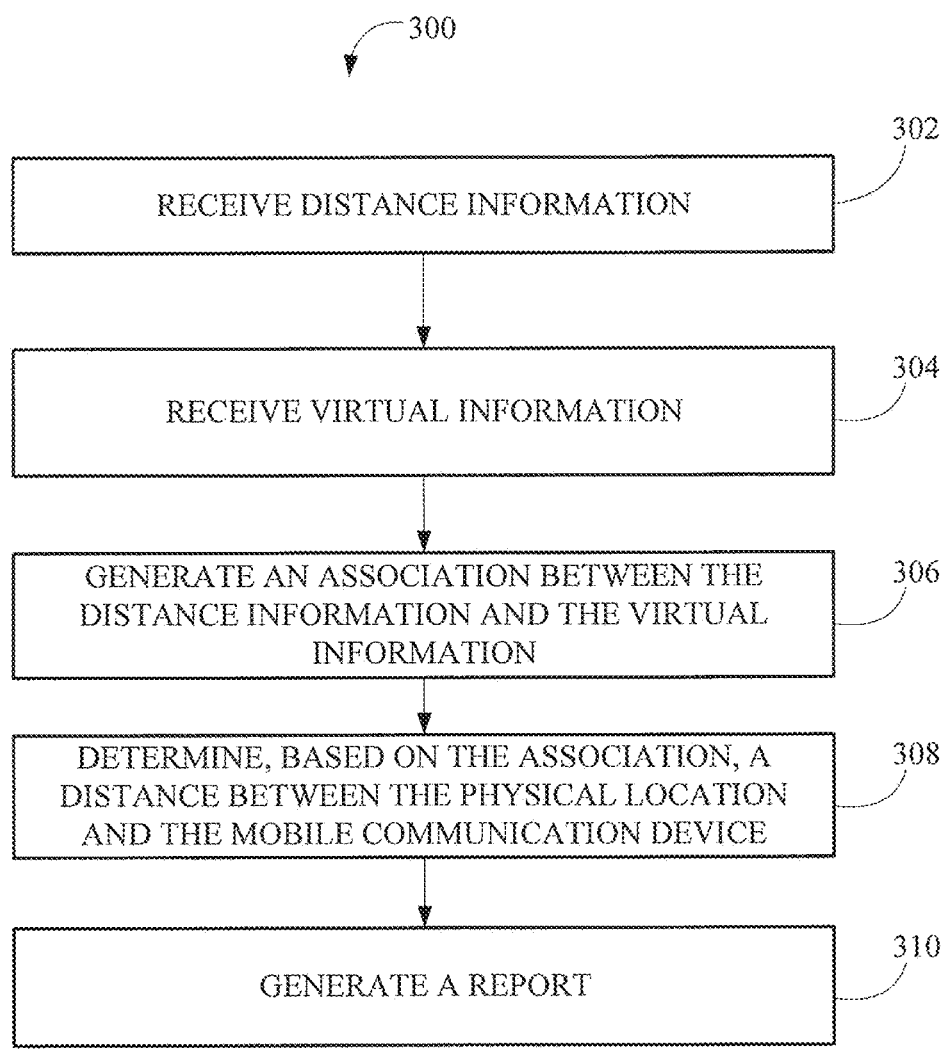
FIG. 3 is a flow diagram illustrating an example process of reporting effectiveness of location-based content items delivered to mobile communication devices, according to various implementations of the disclosure.

FIG. 3 is a flow diagram illustrating an example process 300 of reporting effectiveness of location-based content items delivered to mobile communication devices, according to various implementations of the disclosure. In an operation 302, process 300 may receive distance information that indicates a distance between a mobile communication device (such as mobile communication device 102) and a physical location of an entity. For example, a user of the mobile communication device may be within a distance such as 500 meters of a physical location such as a store of an entity such as a retailer. Process 300 may receive distance information (such as a location of the mobile communication and/or location of the physical location).

In an operation 304, process 300 may receive virtual information that indicates a virtual access by the mobile communication device to a virtual location of the entity. For example, a user of the mobile communication device may select a location-based content item and/or visit a web page of the entity. The virtual information may indicate the selection and/or the visit. In this manner, process 300 may receive information that the user via the mobile communication device has selected or otherwise accessed information related to the entity associated with the location-based content item.

In an operation 306, process 300 may generate an association between the distance information and the virtual information. In other words, process 300 may determine a correlation between the location of the mobile communication device and the virtual access. As would be appreciated, process 300 may perform operations 302, 304, and 306 in one or more operations. For example, process 300 may receive an association of the distance and the virtual access in a single operation (or in multiple operations as described).

In an operation 308, process 300 may determine, based on the association, a distance between the physical location and the mobile communication device when the mobile communication device accessed the virtual location. In other words, process 300 may determine the distance between the mobile communication device and the physical location of the entity when the device made the virtual access to the virtual location of the entity.

In an operation 310, process 300 may generate a report that includes at least a portion of the distance information and at least a portion of the virtual information based on the determined distance from the physical location. In other words, process 300 may provide metrics that includes the location of the mobile communication device and information related to the virtual access so that a viewer of the report may determine the effect of distance on content items communicated to the mobile communication device.

Figure 4:
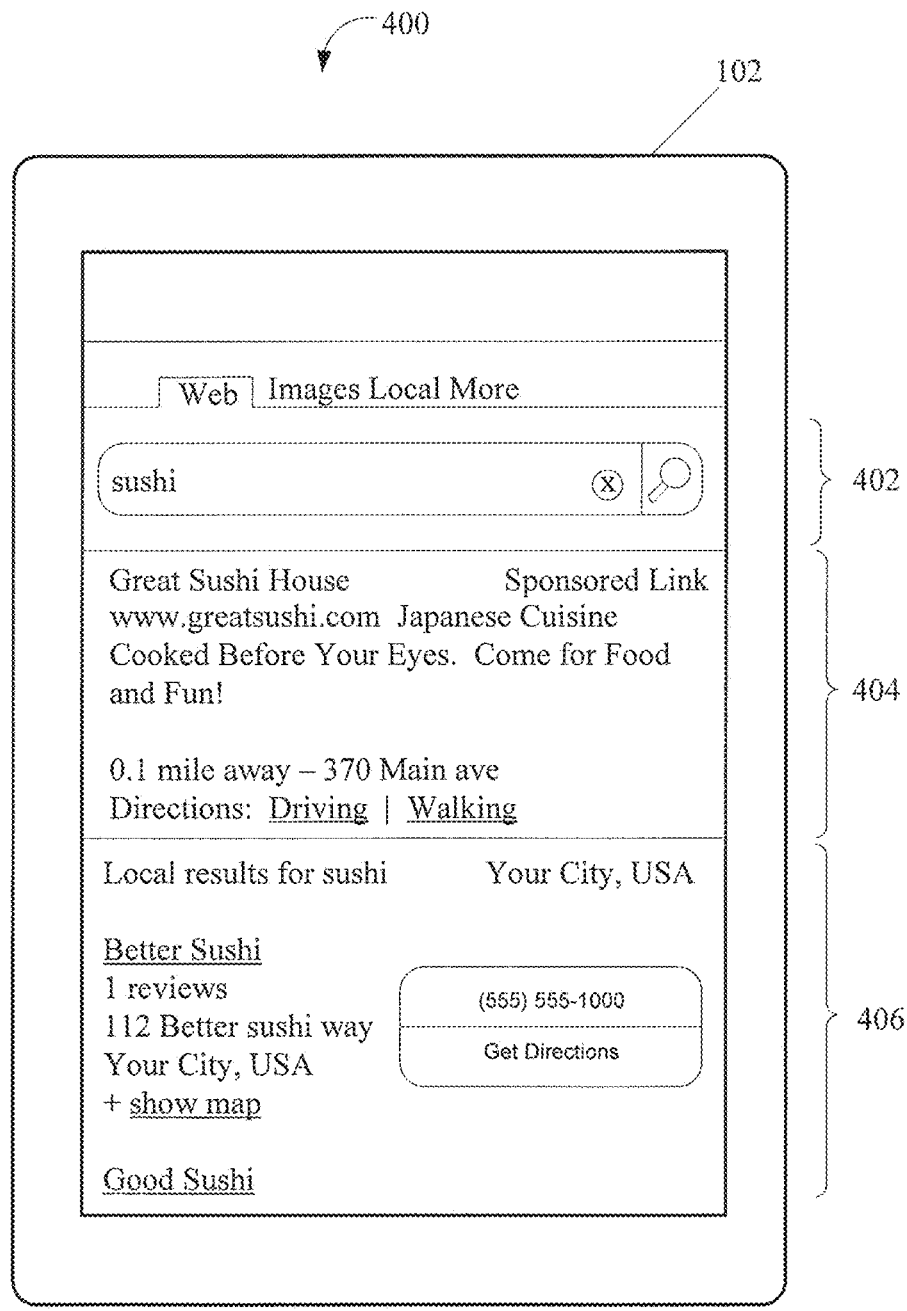
FIG. 4 is a diagram illustrating a location-based content item with directions displayed at a mobile communication device, according to various implementations of the disclosure.

FIG. 4 is a diagram 400 illustrating a location-based content item 404 with directions displayed at mobile communication device 102, according to various implementations of the disclosure. FIG. 4 and other drawing figures illustrating examples of displays are for illustrative purposes only. The examples of displays may include or exclude some graphical elements illustrated while adding other graphical elements not otherwise illustrated in the figures as would be appreciated.

In some implementations of the disclosure, mobile communication device 102 may display a search application such as an Internet browser or dedicated search application. The search application may provide a search input area 402 where one or more search keywords (illustrated in FIG. 4 as "sushi") may be entered. Along with search results 406, the search application may display content item 404. In some implementations of the disclosure, content item 404 may indicate a distance (illustrated in FIG. 4 as "0.1 mile away") from a physical location ("illustrated in FIG. 4 as the address "370 Main ave") of an entity (illustrated in FIG. 4 as "Great Sushi House") associated with content item 404. In some implementations of the disclosure, selection of the distance may cause mobile communication device 102 to display a map of the physical location.

As a result of the search request, the search engine (not otherwise illustrated in FIG. 4) may have made a request, associated with mobile communication device 102, for a content item. In response to the request for a content item, content item serving system 110 may have identified content item 404 from among other content items based on the location of mobile communication device 102 and a potential interest of the user of mobile communication device 102. In other words, in some implementations of the disclosure, content item serving system 110 may not have identified content item 404 if mobile communication device 102 was not sufficiently close to the physical location of the entity. As previously noted, such potential interest may be determined based on interest-based information such as web search history, browsing history, history of selections of content items, and/or other interest-based information.

In some implementations of the disclosure, content item 404 includes directions to the physical location. The directions may include walking directions, driving directions, and/or other directions. In some implementations of the disclosure, a user selection of the directions may cause mobile communication device 102 to display a map, route, and/or text directions to the physical location. In some implementations of the disclosure, the map, route, and/or text directions are included as part of content item 404 (i.e., content of content item 404 may include the map, route, and/or text directions). In some implementations of the disclosure, the map, route, and/or text directions may be provided by mobile communication device 102 or other remote device (rather than being included with content item 404).

Figure 5A:
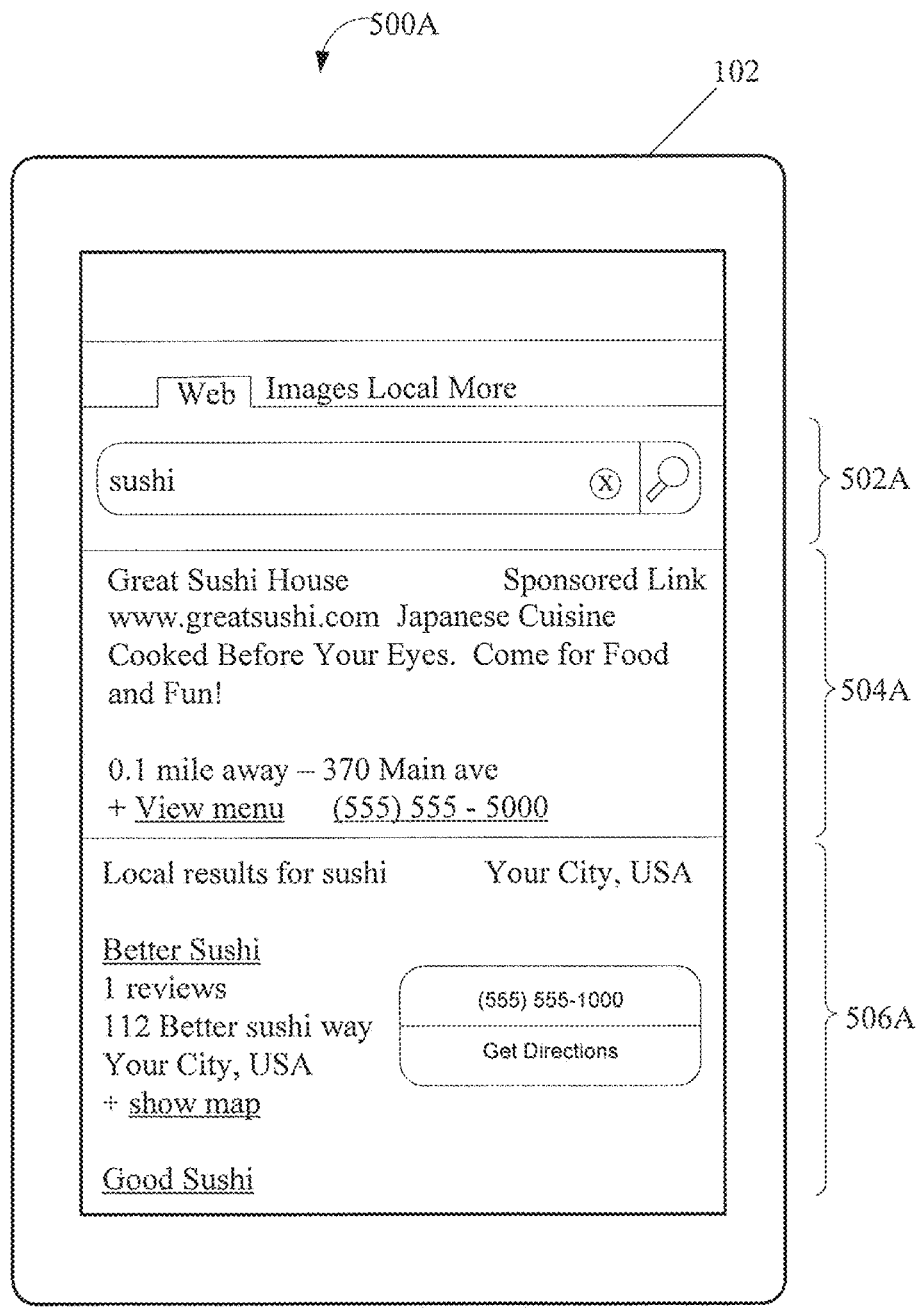
FIGS. 5A and 5B are diagrams illustrating a location-based content item with expandable content displayed at a mobile communication device, according to various implementations of the disclosure.

FIG. 5A is a diagram 500A illustrating a location-based content item 504A with expandable content displayed at mobile communication device 102, according to various implementations of the disclosure. Diagram 500A is similar to diagram 400 illustrated in FIG. 4 except that content item 504A may include a plus-box (illustrated in FIG. 5A as a plus sign with "View menu" link) that when selected expands to show, for example, a restaurant menu. In some implementations of the disclosure, mobile communication device 102 may display a search application. The search application may provide a search input area 502A where one or more search keywords (illustrated in FIG. 5A as "sushi") may be entered. Along with search results 506A, the search application may display content item 504A. In some implementations of the disclosure, content item 504A may indicate a distance similar to the distance illustrated in FIG. 4.

Figure 6:
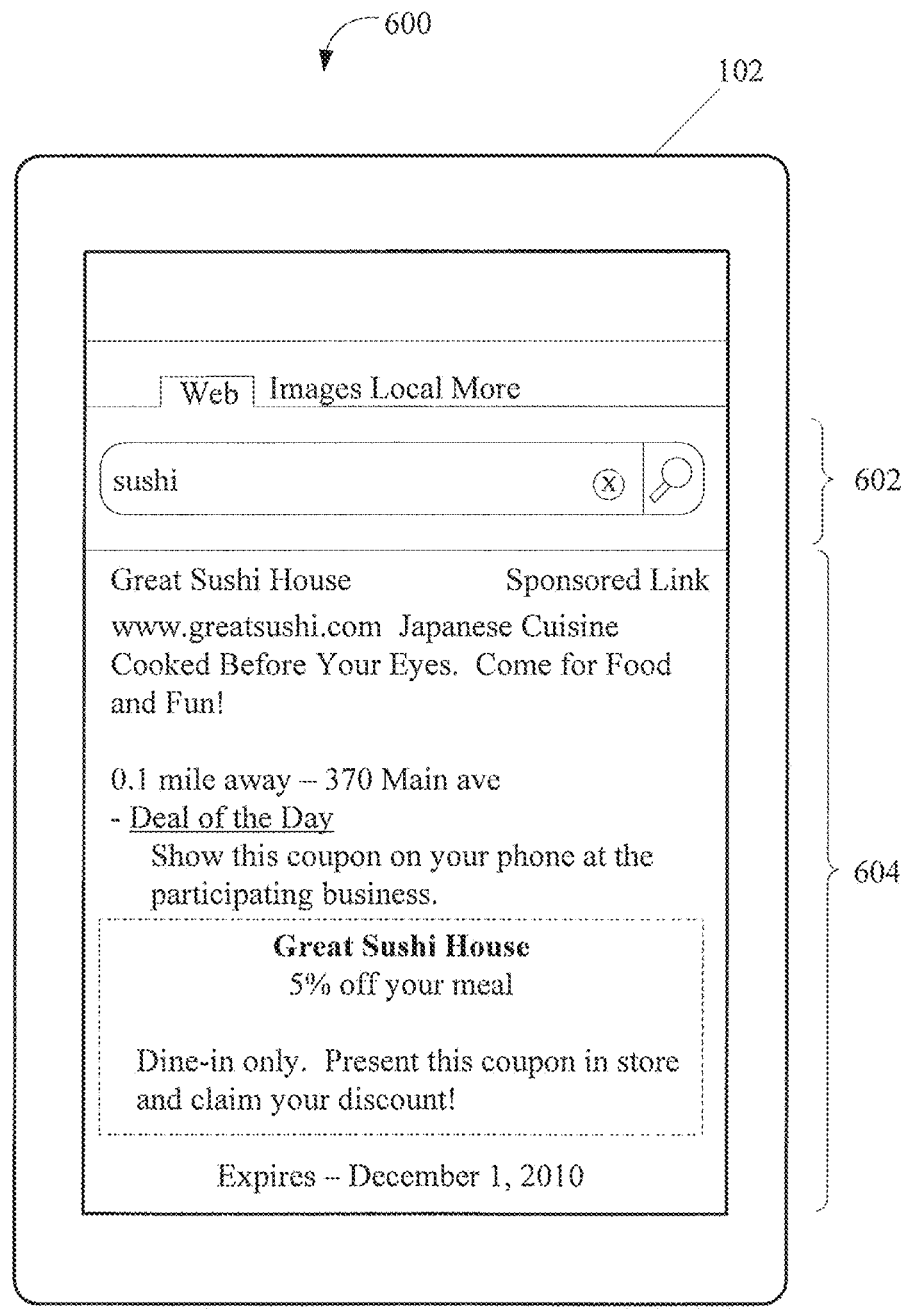
FIG. 6 is a diagram illustrating a location-based content item with expandable content displaying a coupon at a mobile communication device, according to various implementations of the disclosure.

In some implementations of the disclosure, content item 504A may be expandable. For instance, content item 504A includes a restaurant menu and/or menu items. As previously noted, the restaurant menu may be included in content item 504A based on the distance. In other words, in some implementations of the disclosure, the entity (illustrated in FIG. 5A as "Great Sushi House") may specify different content items to be communicated to mobile communication device 102 based on the distance to one of its physical locations (illustrated in FIG. 5A as "370 Main ave"). At a different distance, for example, instead of content item 504A that includes the restaurant menu, the entity may have specified communication of a content item that includes a coupon (as illustrated in FIG. 6), for example, and/or other content. Thus, the entity may specify different content for different distances.

In some implementations of the disclosure, content item 504A may include a call-to-action such as a telephone link that when selected by the user causes mobile communication device 102 to dial the number associated with the telephone link.

Figure 5B:
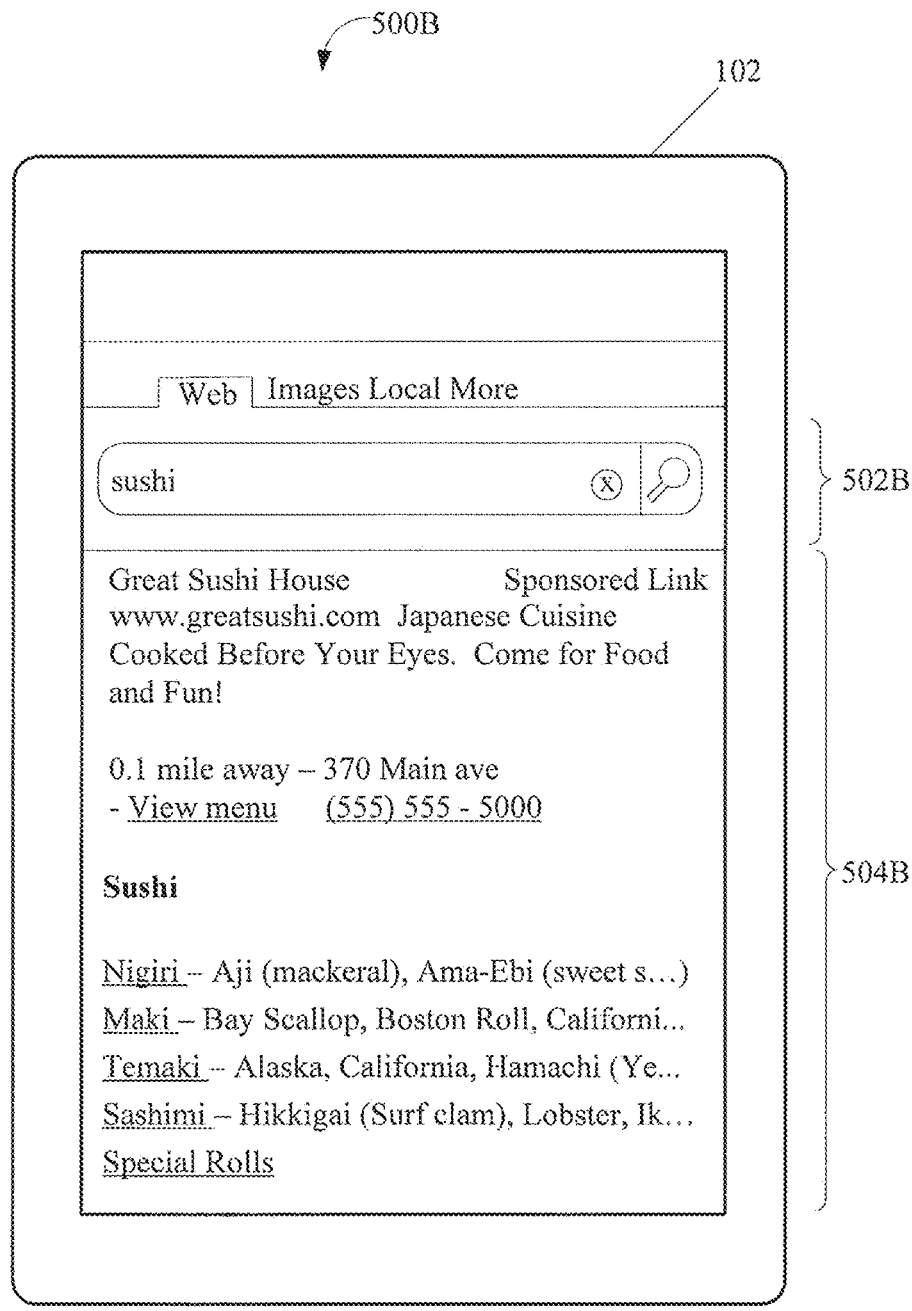

In some implementations of the disclosure, upon a user selection of the plus-box, content item 504A may expand to reveal additional content as illustrated in FIG. 5B.

FIG. 6 is a diagram 600 illustrating a location-based content item with expandable content displaying a coupon at mobile communication device 102, according to various implementations of the disclosure. Diagram 600 is similar to diagram 500A illustrated in FIG. 5A except that content item 604 may include a coupon to the retailer when the plus-box (illustrated in FIG. 6 as a plus sign with "Deal of the Day" link) is expanded. In some implementations of the disclosure, mobile communication device 102 may display a search application. The search application may provide a search input area 602 where one or more search keywords (illustrated in FIG. 5A as "sushi") may be entered.

Figure 7:
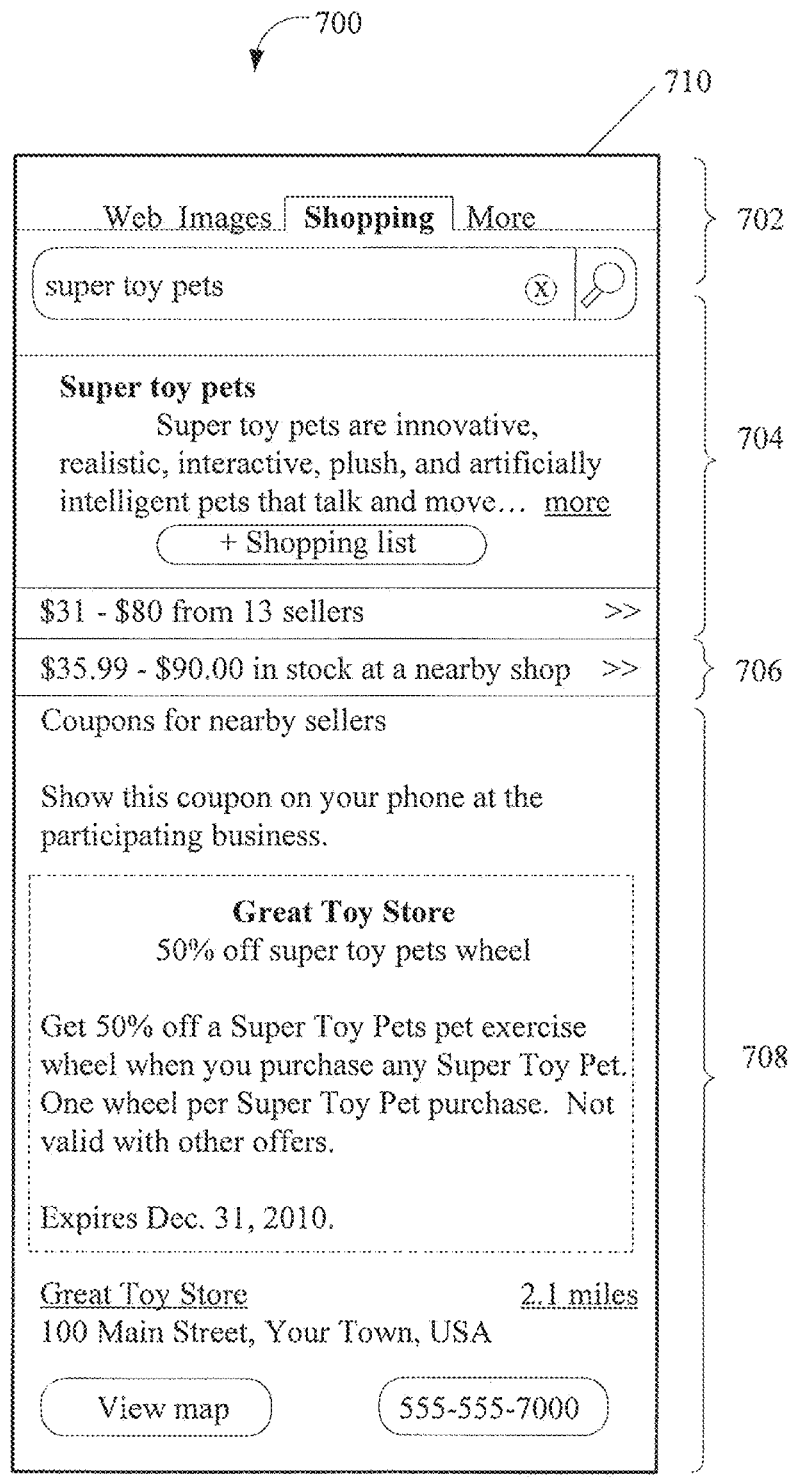
FIG. 7 is a diagram illustrating examples of screen shots of a content item displayed along with a shopping application, according to various implementations of the disclosure.

FIG. 7 is a diagram 700 illustrating an example of a screen shot 710 of a content item displayed along with a shopping application, according to various implementations of the disclosure. In some implementations of the disclosure, the shopping application may include a search input area 702 where one or more search keywords (illustrated in FIG. 7 as "super toy pets") may be entered. Along with shopping results 704, entities selling goods and/or services matching the one or more search keywords and having physical locations nearby may be indicated in results area 706. When selected by the user, results area 706 may cause a device executing the shopping application to display a list of the nearby entities, content items associated with the nearby entities, or other information related to the nearby entities. In some implementations of the disclosure, the shopping application may display content item 708, illustrated in FIG. 7 as a coupon for products that match the one or more search keywords. As previously noted, content item serving system 110 may have identified content item 708 based on the distance from a physical location of the entity associated with content item 708 and potential interests of the user.

Figure 8A:
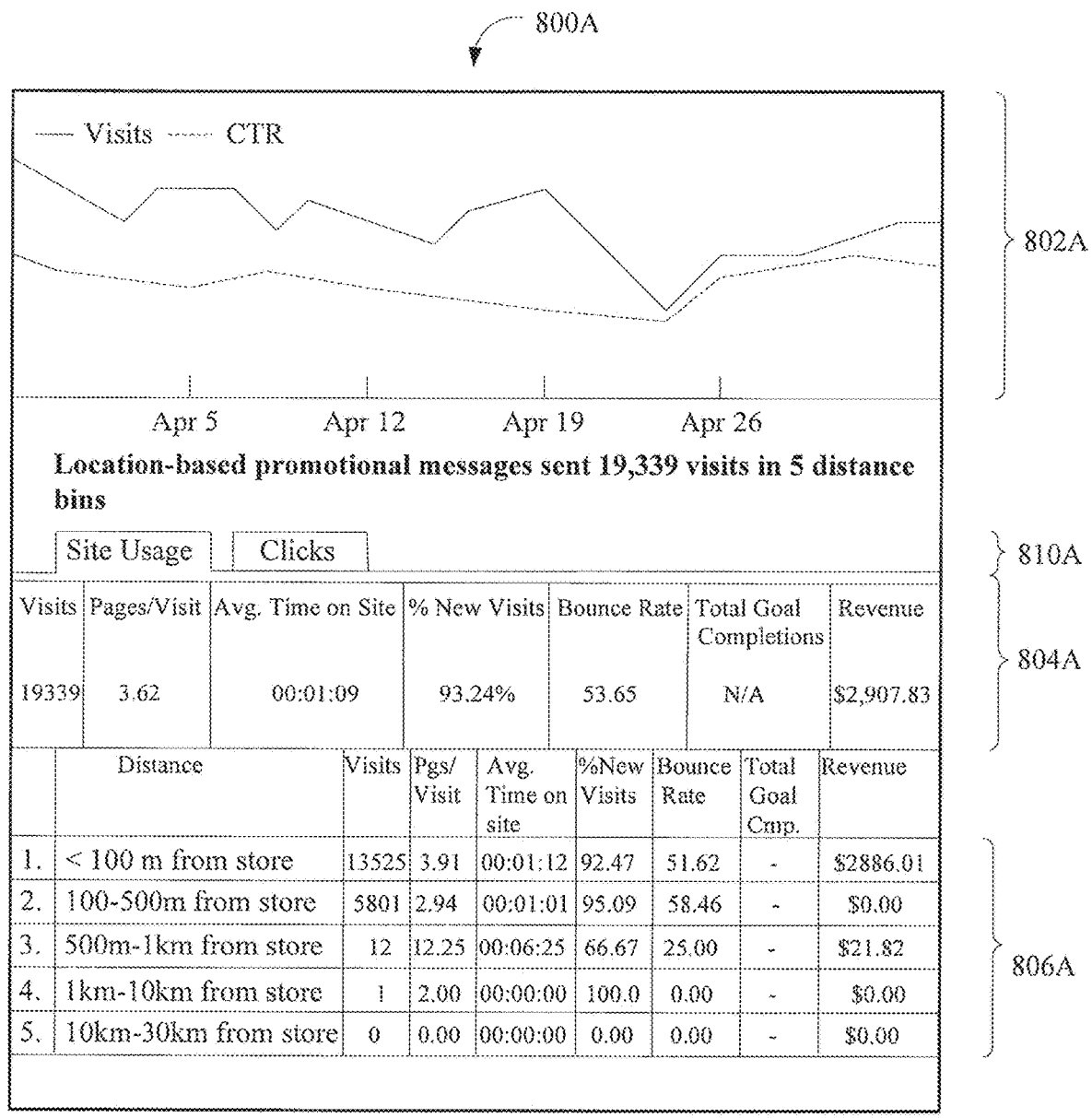
FIGS. 8A and 8B are diagrams illustrating a screenshot of a report that includes one or more metrics indicating effects of distance on success of content items, according to various implementations of the disclosure.
Figure 8B:
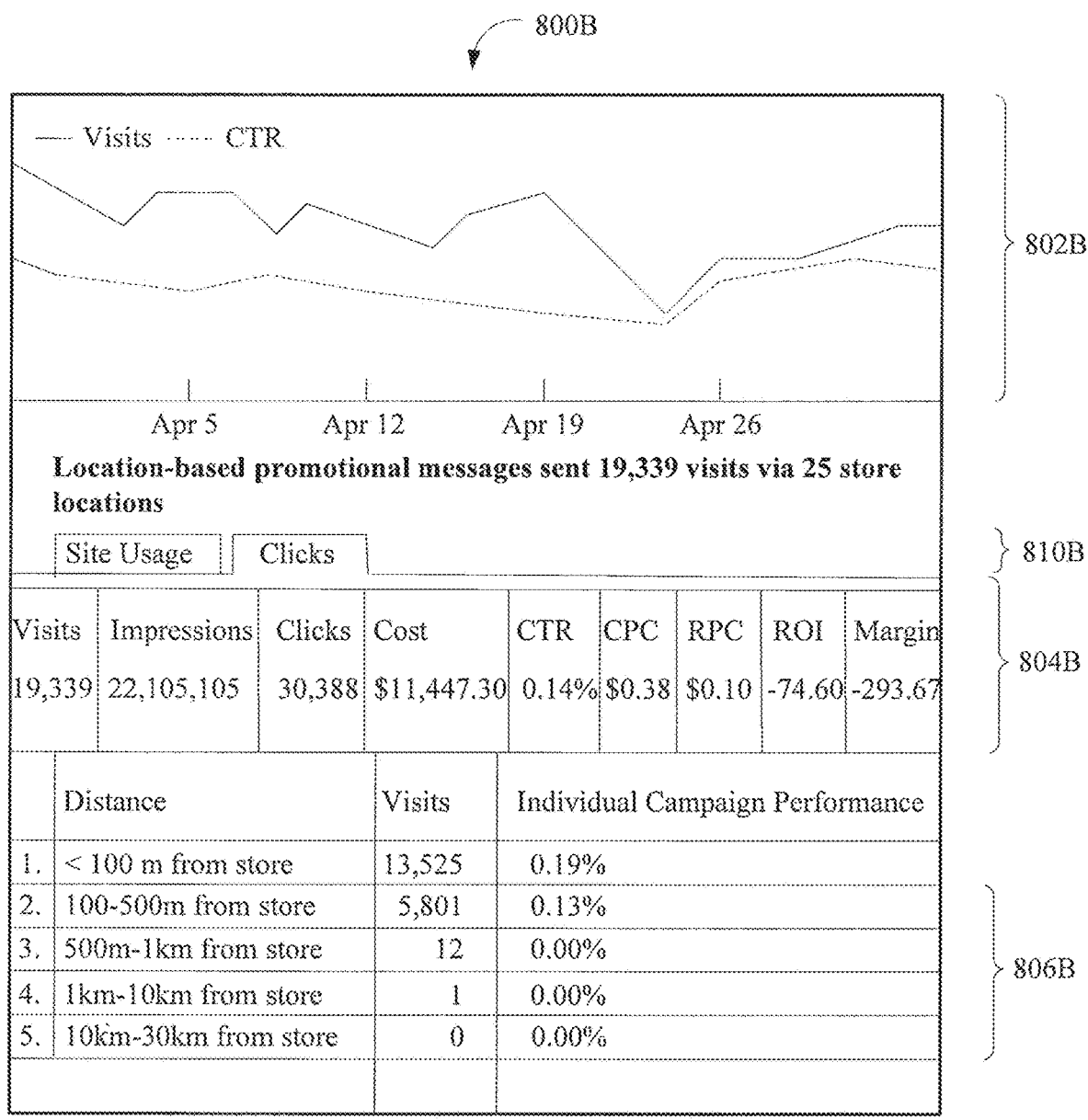

FIGS. 8A and 8B are diagrams illustrating a screenshot of a report 800 that includes one or more metrics indicating effects of distance on success of content items, according to various implementations of the disclosure. Report 800 (illustrated in FIGS. 8A and 8B as reports 800A and 800B) may be generated by metrics analysis system 120 described herein. In some implementations of the disclosure, the report may include a graphical display area 802 (illustrated in FIGS. 8A and 8B as display areas 802A and 802B). The graphical display area 802 may include a line graph, a bar graph, or other graphical display that conveys performance of location-based content items via virtual information such as web page visits, CTRs, and/or other virtual information.

In some implementations of the disclosure, report 800 may include virtual information area 804 (illustrated in FIGS. 8A and 8B as virtual information areas 804A and 804B) displays virtual information such as number of virtual accesses (i.e., visits), average duration of the virtual access (i.e., Avg. Time on Site), and/or other virtual information. In some implementations of the disclosure, the revenue associated with the virtual information may be displayed in virtual information area 804.

In some implementations of the disclosure, report 800 may include distance bin area 806 (illustrated in FIGS. 8A and 8B as distance bin areas 806A and 806B). Distance bin area 806 may display different distance bins that each includes virtual information as a function of distance. In other words, the distance bins group virtual accesses based on the distance a mobile communication device is from a physical location of an entity when the device accessed a virtual location of the entity. In this manner, the effect of distance on the effectiveness of content items may be analyzed using report 800.

In some implementations of the disclosure, report 800 may include tabs 810 (illustrated in FIGS. 8A and 8B as tabs 810A and 810B). Selection of tabs 800 may cause report 800 to display another report based on the particular tab 800 that was selected. For instance, the "Site Usage" tab may cause report 800A to be displayed. Report 800A may display virtual information based on virtual accesses, such as visits, to be displayed. The "Clicks" tab may cause report 800B to be displayed. Report 800B may display virtual information based on selections or clicks.

Figure 9:
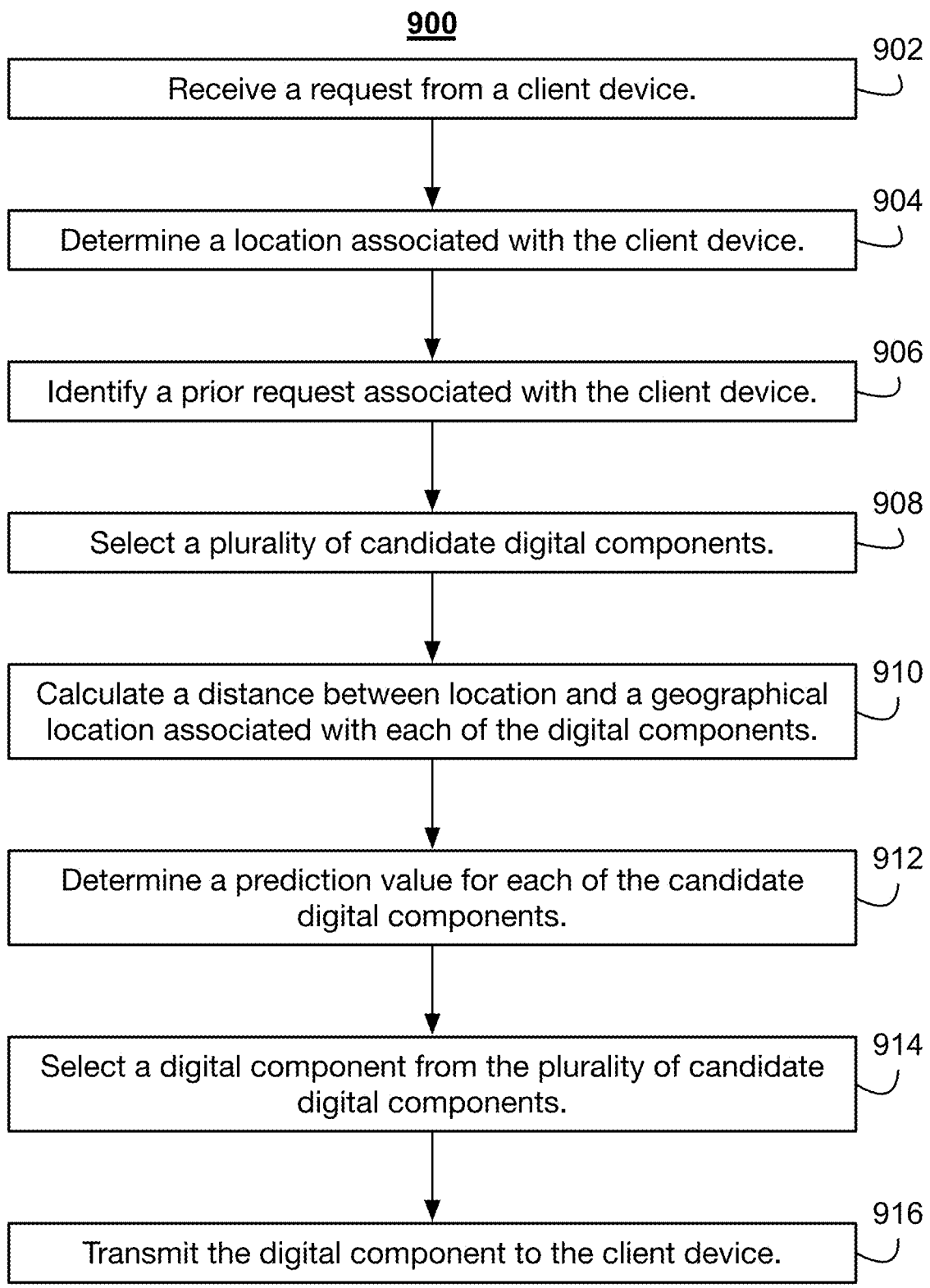
FIG. 9 illustrates an example method for selecting digital components, according to various implementations of the disclosure.

FIG. 9 illustrates a flow chart of an example method 900 for selecting digital components. The method 900 can include receiving a request (ACT 902). The method 900 can include determining a location associated with the client device (ACT 904). The method 900 can include identifying a prior request associated with the client device (ACT 906). The method 900 can include selecting a plurality of candidate digital components (ACT 908). The method 900 can include calculating a distance between the location and a geographical location associated with each of the candidate digital components (ACT 910). The method 900 can include determining a prediction value for each of the candidate digital components (ACT 912). The method 900 can include selecting a digital component from the plurality of candidate digital components (ACT 914). The method 900 can include transmitting the selected digital component to the client device (ACT 916).

As set forth above, the method 900 can include receiving a request from a client device (ACT 902). The request can be received by a data processing system. The request can include one or more keywords. In some implementations, the request can be an input audio signal. The signal can be detected by a sensor of the client device, such as a microphone. The data processing system can parse the input audio signal to identify the request and the one or more keywords within the input audio signal. For example, the data processing system can execute, launch, or invoke the NLP component to receive packet or other protocol based transmissions via the network from the client device. The data packets can include or correspond to an input audio signal detected by the sensor, such as an end user saying "OK, I would like to go to go dinner and then a movie tonight" into a smartphone or assistant device. The data processing system can also identify trigger keywords within the input audio signal and request. For example, continuing the above example, the NLP component can parse the input audio signal to identify trigger keywords such as "go" "go to" or "to go to" that corresponds or relate to the request. In some implementations, the request can be a component of a search. For example, the end user could submit the request, "Ok, where is the nearest restaurant?"

The method 900 can include determining a location associated with the client device (ACT 904). The location can be the location of the client device that transmitted the request to the data processing system. In some implementations, the location can be a location of a second client device that is associated with the client device that transmitted the request to the data processing system. For example, multiple devices can be associated with one another through a unique login, a family account, or other grouping. The data processing system can use the location from which the request originated or any other device associated with the originating client device. In some implementations, the location can be determined based on location information communicated from the client device to the data processing system for the purpose of locating the device (such as geographic coordinates communicated by the device when the user has granted location-based information to be communicated). In some implementations, the location can be determined based on location-based information associated with the client device. This location-based information can include, for example, an IP address of the client device, IP address of a carrier associated with the client device, or a network identification name (e.g., an SSID of a nearby wireless network). The location of the client device can be set by the user. For example, for a speaker-based digital assistant, the user can provide a location for the data processing system to associate with the speaker-based digital assistant. In some implementations, the location of the client device can dynamically update. The location of the client device may update when polled, every minute, every 30 minutes, every hour, or every several hours. The location can be determined using a GPS module within the client device or cellular tower location information.

The method 900 can include identifying a prior request associated with the client device (ACT 906). The prior request can indicate or otherwise be associated with an interest of a user associated with the client device. For example, the interest can be based on past search histories provided by the client device to the data processing system. The interests can also be based on prior web browsing histories, selection of digital components, or actions associated with the request. For example, the request can trigger a thread that includes multiple actions. The actions of the thread can occur in a set, sequential order. For a thread including three actions, for the second action, the prior request can be a request associated with the first action. The method can also include providing an indication of the third action prior to an occurrence of the second action. For example, the content selector component can receive the indication of the third action prior to occurrence of the first action or prior to occurrence of the second action. The indication of the third action can be generated by the prediction component. The prediction component can generate the indication based on the request or the prior request. For example, for the request, "Ok, what time does the movie start," the prediction component can determine there is a high probability the user will provide the request of "Ok, what restaurants are near the movie theater." The indication of the third action can be an indication that the user will request restaurant locations near the movie theater.

The method 900 can include selecting a plurality of candidate digital components (ACT 908). Each of the candidate digital components can be associated with a geographical location. For example, if the digital component is associated with a restaurant, the geographical location associated with the digital component can be the physical location of the restaurant. The digital component can be selected by the content selector component. The content selector component can select or otherwise identify the candidate digital components as digital components that are capable of fulfilling the request. The content selector component can select or otherwise identify the candidate digital components as digital components that correspond to an action identified in response to the request.

The method 900 can include calculating a distance between the location and the geographical location associated with each of the candidate digital components (ACT 910). Each of the candidate digital components can be associated with the physical location. For example, the physical location can be the location of a brick and mortar store associated with the digital component. The distance determined by the data processing system can be calculated along a substantially straight line between the location of the client device and the geographical location. In some implementations, the distance can be the distance of a route (e.g., a driving or walking route) between the location of the client device and the geographical location associated with the digital component.

The method 900 can include determining a prediction value for each of the candidate digital components (ACT 912). Each prediction value can be based on the distance between the location associated with the client device and the geographical location of the respective on of the candidate digital components. The prediction value can also be based on the prior request. The prediction value can also be based on an interest of the user associated with the client device. Each prediction value can indicate a probability that a corresponding digital component will be selected by a user of the client device. For example, using both the location of the user and the interest of the user, the method may identify a likelihood that a digital component will be selected by the user. In the foregoing example, a digital component from a sporting goods retailer may be more likely to be selected by the user than a digital component associated with a bakery. Also in the foregoing example, a digital component from a sporting goods retailer that has a store nearby the user may be more likely to be selected by the user than a sporting goods retailer that has a store that is far from the user.

The method 900 can include selecting a digital component from the plurality of candidate digital components (ACT 914). The digital components can be selected based on the prediction values calculated for each of the candidate digital components. The selection can be made by ranking each of the candidate digital components based on the prediction values and selecting the digital component with the highest prediction value. In some implementations, the selection process can also include an auction process. The digital component can be selected by the content selector component. The method can also include selecting a type of display content of the digital component based on the present location associated with the client device and the geographical location of the digital component. For example, if the client device is within a predetermined threshold distance of the geographical location associated with the selected digital component, the type of display content can be walking directions to the geographical location. If the client device is outside of the predetermined threshold distance and the digital component is associated with a restaurant, the type of display content can be an action to set a reservation restaurant.

The method 900 can include transmitting the digital component to the client device (ACT 916). The data processing system can generate an output audio signal that includes the selected digital component. The digital component, in the output audio signal, can be transmitted to the client device. The digital component can be transmitted to a second client that is different than the client device. For example, the interface can transmit data packets that include the output audio signal from the data processing system to the client device. The data processing system can delay or prevent transmittal of the data packets until the data processing system detects the occurrence of a condition, such as the expiration of one of time periods, or until receipt of an authorization from the client device.

The output signal can cause the client device (e.g., can cause an app or other component of the data processing system 110 that resides and executes at the client device to drive the speaker to generate an acoustic wave that corresponds to the output signal (and to the digital component). This audio output of the content item from the client device can occur prior to occurrence of the first action or prior to occurrence of the second action. The method can receive from the client device a response to the content item. For example, the data processing system can receive a response signal from audio input into the client device that requests that an action be initiated or taken, such as a request to reserve a taxi or purchase event tickets. The direct action API can invoke programs to take or initiate the requested action. This action can be initiated by the direct action API based on receipt of the response signal as well as other factors such as the time of completion of an action. The action can also be cancelled. For example, the data processing system can cancel the action due to a cancellation or termination of actions of the thread, changes to the thread, or receipt by the data processing system of a cancellation request from the client device.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, prediction component 121 or NLP component 105 and other data processing system 110 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 106). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 110 from the client device 102 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 105, the content selector component 125, or the prediction component 121 can be a single component, app, or program, or a logic device having one or more processing circuits, or part of one or more servers of the data processing system 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 110 can select a content item for a subsequent action (e.g., for the third action 215) based in part on data from a prior action in the sequence of actions of the thread 220, such as data from the second action 211 indicating that the second action 211 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to select digital components, comprising:
one or more processors to:
receive, from a client device, a request comprising one or more keywords;
determine a present location associated with the client device, the present location determined based on at least one of global positioning system (GPS) information, network information, keyword search information, or map application information transmitted from the client device;
identify a prior request received by the one or more processors and associated with the client device, a response to the prior request provided by the one or more processors prior to receipt of the request from the client device;
select a plurality of candidate digital components, each of the plurality of candidate digital components associated with a geographical location;
determine a distance between the present location associated with the client device and the geographical location of each of the plurality of candidate digital components;
determine a prediction value for each of the plurality of candidate digital components, the prediction value based on the prior request, a metric associated with the response to the prior request, and the distance between the present location associated with the client device and the geographical location of each of the plurality of candidate digital components;
select a digital component from the plurality of candidate digital components based on the prediction value of each of the plurality of candidate digital components, wherein the digital component is configured to receive input and make a reservation at the geographical location; and
transmit the digital component to the client device to cause the client device to present, via an application executed by the client device, the digital component.

2. The system of claim 1, wherein the one or more processors are further configured to:
identify an interest of a user associated with the client device based on the prior request; and
determine the prediction value based on the interest of the user associated with the client device.

3. The system of claim 1, wherein the one or more processors are further configured to select a type of display content of the digital component based on the present location associated with the client device and the geographical location of the digital component.

4. A method to select digital components, comprising:
receiving, by one or more processors of a data processing system from a client device, a request comprising one or more keywords;
determining, by the one or more processors of the data processing system, a present location associated with the client device, the present location determined based on at least one of global positioning system (GPS) information, network information, keyword search information, or map application information transmitted from the client device;
identifying, by the one or more processors of the data processing system, a prior request received by the data processing system and associated with the client device, a response to the prior request provided by the data processing system prior to receipt of the request from the client device;
selecting, by the one or more processors of the data processing system, a plurality of candidate digital components, each of the plurality of candidate digital components associated with a geographical location;
calculating, by the one or more processors of the data processing system, a distance between the present location associated with the client device and the geographical location of each of the plurality of candidate digital components;
determining, by the one or more processors of the data processing system, a prediction value for each of the plurality of candidate digital components, the prediction value based on the prior request, a metric associated with the response to the prior request, and the distance between the present location associated with the client device and the geographical location of each of the plurality of candidate digital components and the prior request;
selecting, by the one or more processors of the data processing system, a digital component from the plurality of candidate digital components based on the prediction value of each of the plurality of candidate digital components, wherein the digital component is configured to receive input and make a reservation at the geographical location; and transmitting the digital component to the client device to cause the client device to present, via an application executed by the client device, the digital component.

5. The method of claim 4, comprising:
identifying an interest of a user associated with the client device based on the prior request; and
determining the prediction value based on the interest of the user associated with the client device.

6. The method of claim 4, comprising:
selecting a type of display content of the digital component based on the present location associated with the client device and the geographical location of the digital component.

7. The system of claim 1, wherein the digital component comprises directions to the geographical location associated with the digital component.

8. The system of claim 1, wherein the one or more processors are further configured to:
determine, for each of the plurality of candidate digital components, a first weighting factor based on the prior request;
determine, for each of the plurality of candidate digital components, a second weighting factor based on the distance between the present location associated with the client device and the geographical location of each of the plurality of candidate digital components; and
select the digital component based on the first weighting factor and the second weighting factor for each of the plurality of candidate digital components.

9. The system of claim 1, wherein the one or more processors are further configured to:
select the digital component based on a prediction value associated with the prior request.

10. The system of claim 1, wherein the one or more processors are further configured to:
determine an accuracy of the distance between the present location associated with the client device and the geographical location of each of the plurality of candidate digital components; and
determine the prediction value for each of the plurality of candidate digital components based on the accuracy of the distance between the present location associated with the client device and the geographical location of each of the plurality of candidate digital components.

11. The system of claim 1, wherein the one or more processors are further configured to:
select the digital component based on a second digital component selected in response to the prior request.

12. The method of claim 4, wherein the digital component comprises directions to the geographical location associated with the digital component.

13. The method of claim 4, comprising:
determining, by the one or more processors of the data processing system and for each of the plurality of candidate digital components, a first weighting factor based on the prior request;
determining, by the one or more processors of the data processing system and for each of the plurality of candidate digital components, a second weighting factor based on the distance between the present location associated with the client device and the geographical location of each of the plurality of candidate digital components; and
selecting, by the one or more processors of the data processing system, the digital component based on the first weighting factor and the second weighting factor for each of the plurality of candidate digital components.

14. The method of claim 4, comprising:
selecting, by the one or more processors of the data processing system, the digital component based on a prediction value associated with the prior request.

15. The method of claim 4, comprising:
determining, by the one or more processors of the data processing system, an accuracy of the distance between the present location associated with the client device and the geographical location of each of the plurality of candidate digital components; and
determining, by the one or more processors of the data processing system, the prediction value for each of the plurality of candidate digital components based on the accuracy of the distance between the present location associated with the client device and the geographical location of each of the plurality of candidate digital components.

16. The method of claim 4, comprising:
selecting, by the one or more processors of the data processing system, the digital component based on a second digital component selected in response to the prior request.

* * * * *